March 10, 1970 A. C. PALATINUS 3,500,228

MEANS FOR GENERATING A DOUBLE SIDEBAND SUPPRESSED CARRIER AM WAVE

Original Filed Sept. 11, 1964 10 Sheets-Sheet 1

INVENTOR.
ANTHONY C. PALATINUS

INVENTOR.
ANTHONY C. PALATINUS

INVENTOR.
ANTHONY C. PALATINUS

INVENTOR.
ANTHONY C. PALATINUS

March 10, 1970 A. C. PALATINUS 3,500,228

MEANS FOR GENERATING A DOUBLE SIDEBAND SUPPRESSED CARRIER AM WAVE

Original Filed Sept. 11, 1964 10 Sheets-Sheet 5

INVENTOR.
ANTHONY C. PALATINUS

INVENTOR.
ANTHONY C. PALATINUS

INVENTOR.
ANTHONY C. PALATINUS

INVENTOR.
ANTHONY C. PALATINUS

INVENTOR
ANTHONY C. PALATINUS

INVENTOR.
ANTHONY C. PALATINUS

United States Patent Office 3,500,228

Patented Mar. 10, 1970

3,500,228

MEANS FOR GENERATING A DOUBLE SIDEBAND SUPPRESSED CARRIER AM WAVE

Anthony C. Palatinus, 68–17 60th Road, Maspeth, N.Y. 11378

Original application Sept. 11, 1964, Ser. No. 395,965, now Pat. No. 3,411,079, dated Nov. 12, 1968. Divided and this application Nov. 9, 1967, Ser. No. 704,197

Int. Cl. H03b *21/02, 23/00*

U.S. Cl. 331—39 3 Claims

ABSTRACT OF THE DISCLOSURE

A varying signal generation arrangement that provides an RF two tone swept-in-step signal of constant audio frequency separation between the frequency varying tones. A selectable audio frequency separation is produced by the process of single tone double sideband suppressed carrier amplitude modulation. Utilizing a drift-free modulator and selection of the suppressed carrier frequency there follows a linear variation with time due to the transfer of a swept frequency excursion about its selected location.

The invention described herein may be manufactured and used by or for the Government of the United States of America for government purposes without the payment of any royalties thereon or therefor.

This application is a division of application Ser. No. 395,965 filed Sept. 11, 1964 now Patent No. 3,411,079.

The present invention relates generally to the continuous measurement and evaluation of the linearity of the transfer function of various electrical devices and to the analysis and display indication of intermodulation distortion characteristics over a narrow bandwidth of such devices in the RF region. In particular the invention refers to the determination of the distortion component content of the spectrum output resulting from the response of an active electrical unit, such as an amplifier, or passive devices such as crystal filters, to a two tone RF test signal linearly varying in time over a selected frequency band.

The present invention is related to my copending application entitled "Drift-Free Sweep Frequency Generator," Ser. No. 120,096 filed June 27, 1961, now abandoned. With respect to the copending application, this present invention further implements, in a novel manner, the subject drift-free modulator in the generation of a unique test signal, and includes a likewise novel output measuring method and apparatus.

Presently available equipment for static RF two tone generation and measurement of the degree of linearity of RF amplifiers and particularly those amplifiers that operate in the high frequency region and above, having relatively narrow bandwidths or of high selectivity, suffer from the lack of an extremely stable test signal source, insufficient variation of the frequency range, and the lack of sensitivity with a resultant excessive expenditure of measurement time. Of recent date, it has become fairly apparent that there exists a desirability and necessity for making extensive measurements of distortion characteristics of near linear or quasi linear stages or devices in the RF regions.

Conventional art makes frequent use of a static two tone, equal amplitude test signal which is applied in conjunction with complex, highly selective, frequency scanning, narrow band spectrum analyzers to measure and display the odd order intermodulation distortion content produced by the non-linearity of the unit under test.

Furthermore, a static two tone test signal has drawbacks in that it represents a less realistic modulating waveform than the typical speech or voice modulation normally experienced by linear RF transmission systems. In order to obtain more meaningful results supplementary measurements are often required under static conditions with the use of more complex inputs such as band limited noise. It is also generally known that the transfer function of a system normally varies with the absolute frequencies of the test tone pair as well as with the frequency difference that exists between the tones themselves. Hence, clearly numerous separate tests must be undertaken and much data collected when the static two tone test signal is employed to measure the distortion characteristic of quasi-linear unit over a frequency band requiring a considerable number of tone combinations. It is evident that a new stable two-tone type test source would contribute to the art. This test source need thereby generate a two tone signal varying linearly with time wherein the RF absolute frequency values of the two frequencies can be varied over a selected frequency range and wherein the frequency difference between the two tones can also be varied. Such a test signal for inter-modulation distortion measurement would more nearly simulate multiple tone modulation.

It is an object of this invention to provide a method and apparatus for the generation of a highly stable RF test signal that constittues a non-stationary, closely spaced, two tone type signal, with the tones being equal amplitude and having the instantaneous value of their absolute frequencies varying linearly with time over a selected frequency band while maintaining the audio frequency difference between the tones constant during the set frequency excursion.

It is a further objective of this invention to provide a method and test system that produces a family of RF intermodulation distortion component plots with respect to either the mean frequency value of the RF sweeping two tone signal, or with respect to the instantaneous frequency value of one of the two main tones, in a drift-free manner governed by frequency synthesizer control over a wide frequency range of operation.

Other objects and advantages will appear from the following description of an example of the invention, and the novel features will be particularly pointed out in the appended claims.

In the accompanying drawings, FIGS. 1*a* and 1*b* are an elementary overall system block diagram of an embodiment of an intermodulation spectrum analyzer made in accordance with the principle of this invention:

FIG. 4 is a block diagram of the modulator output stages and of the closed loop sawtooth generator;

Figure 1A:
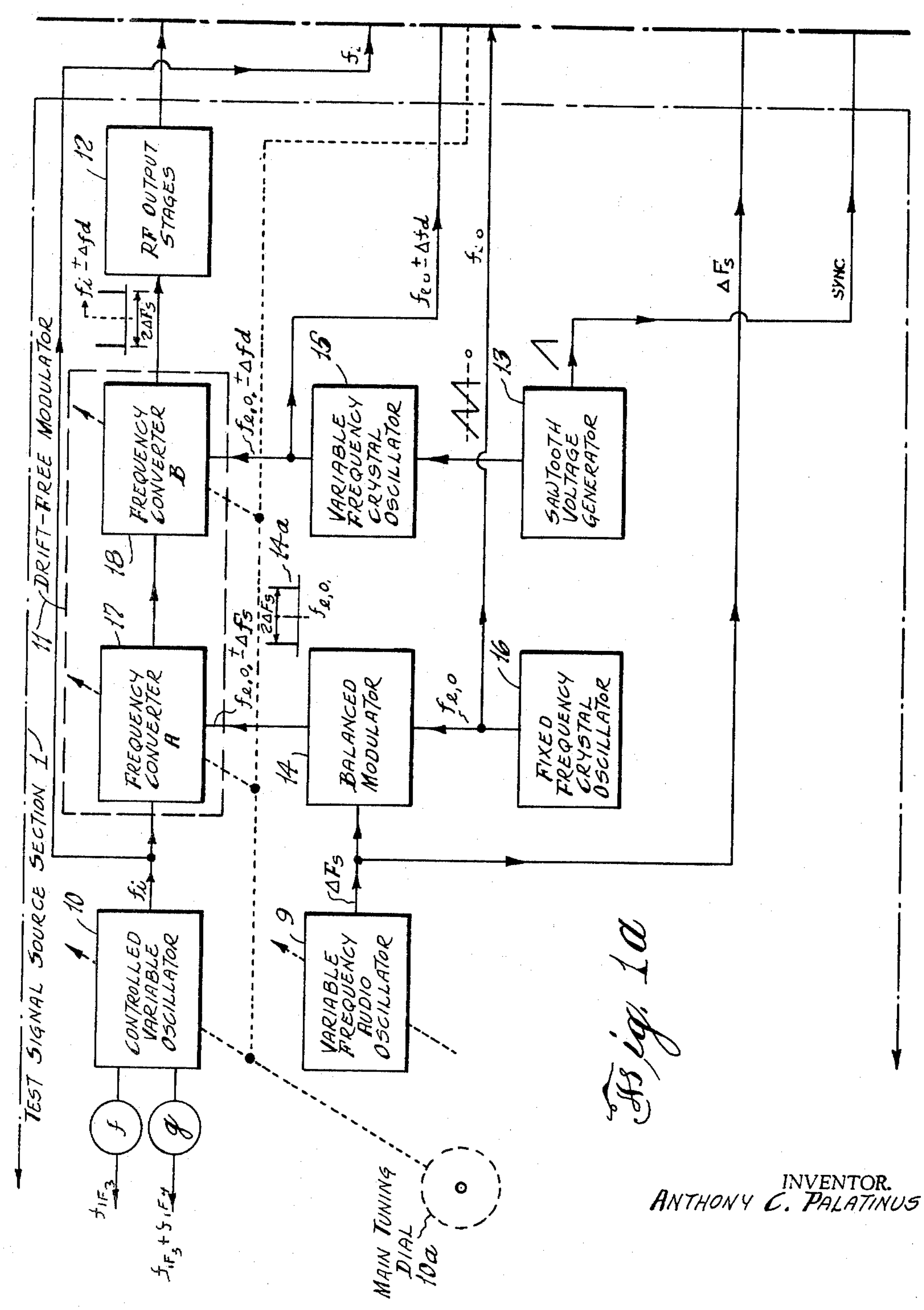
Figure 1B:
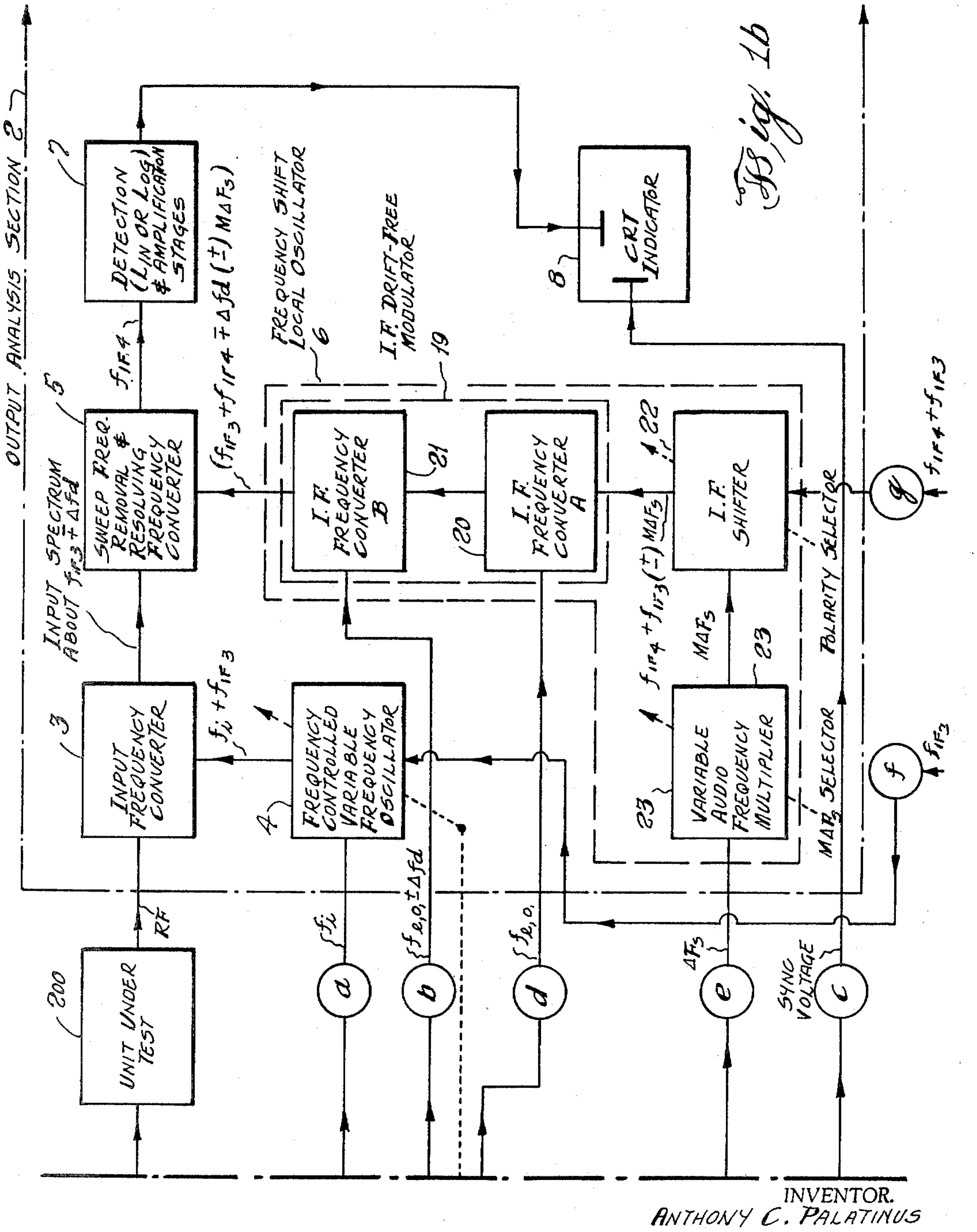
Figure 5A:
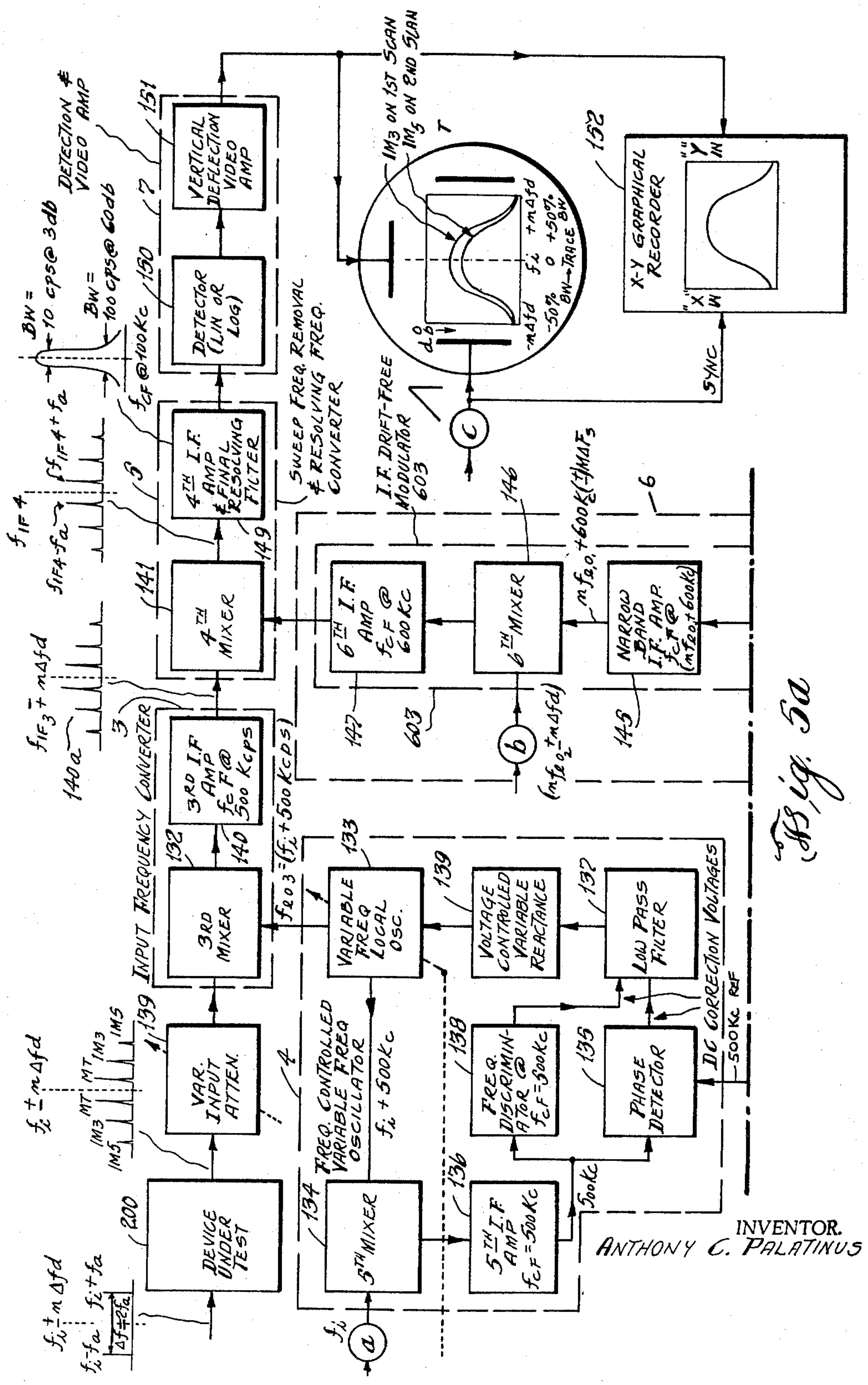
Figure 5B:
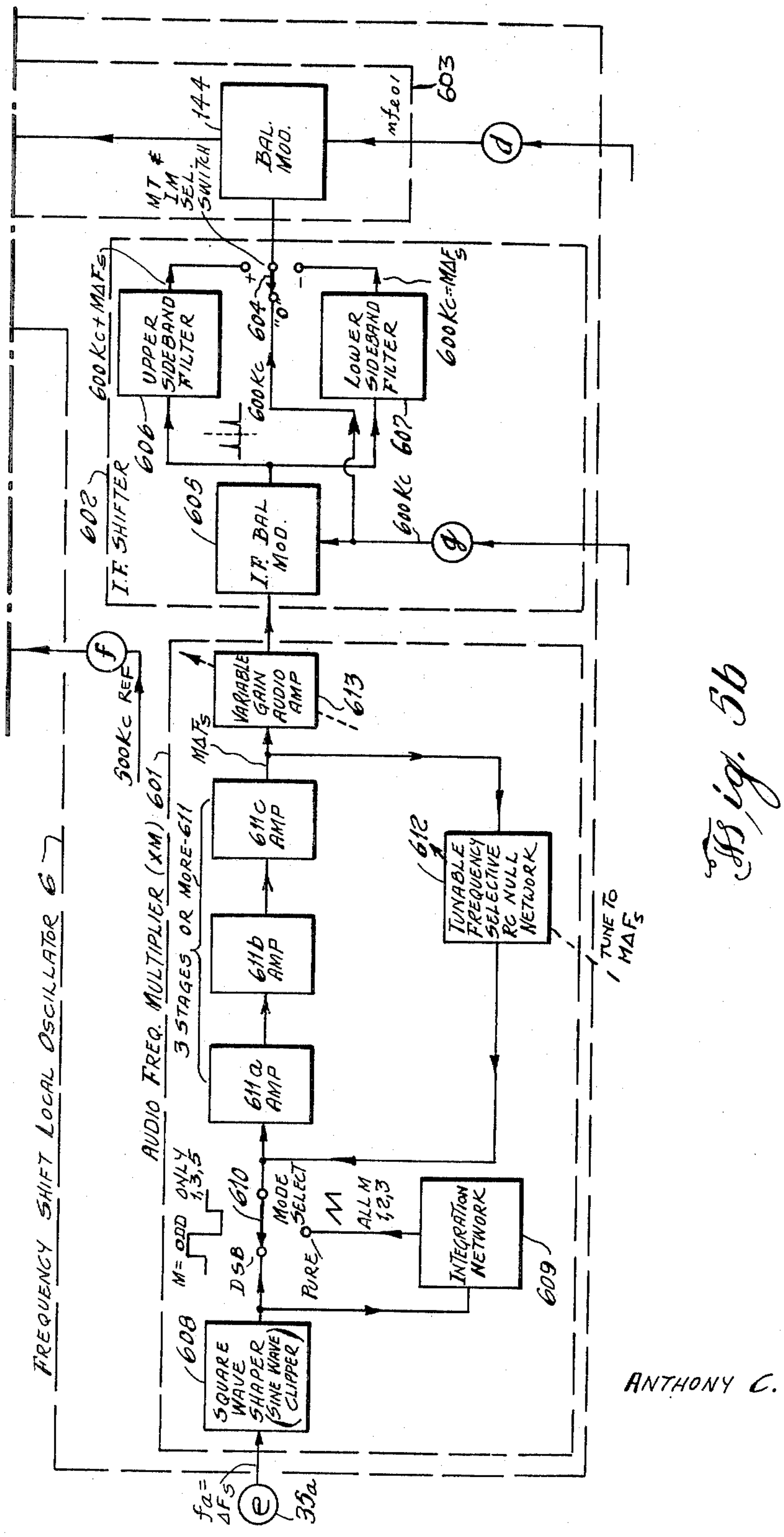
Figure 6:
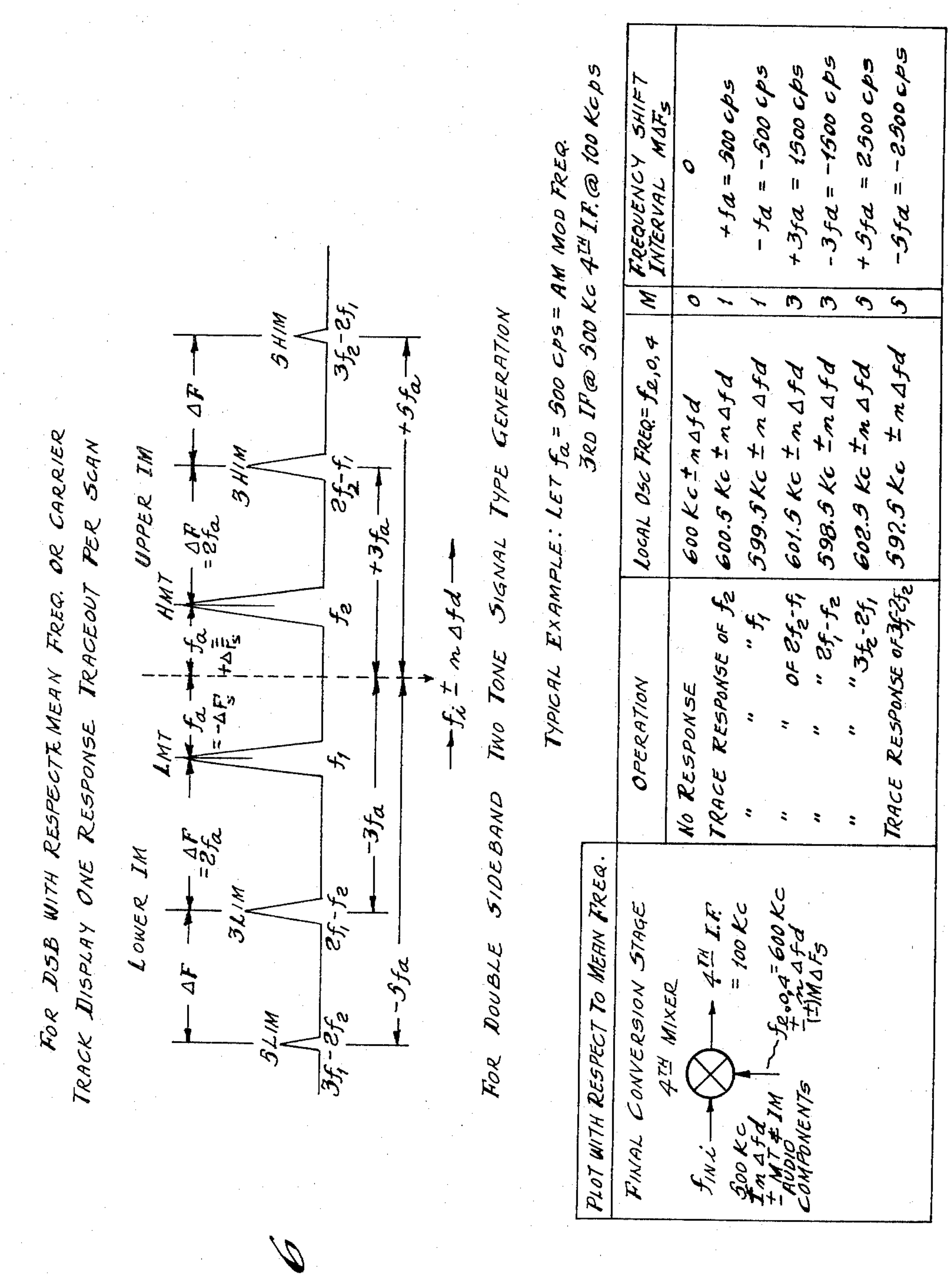
Figure 7:
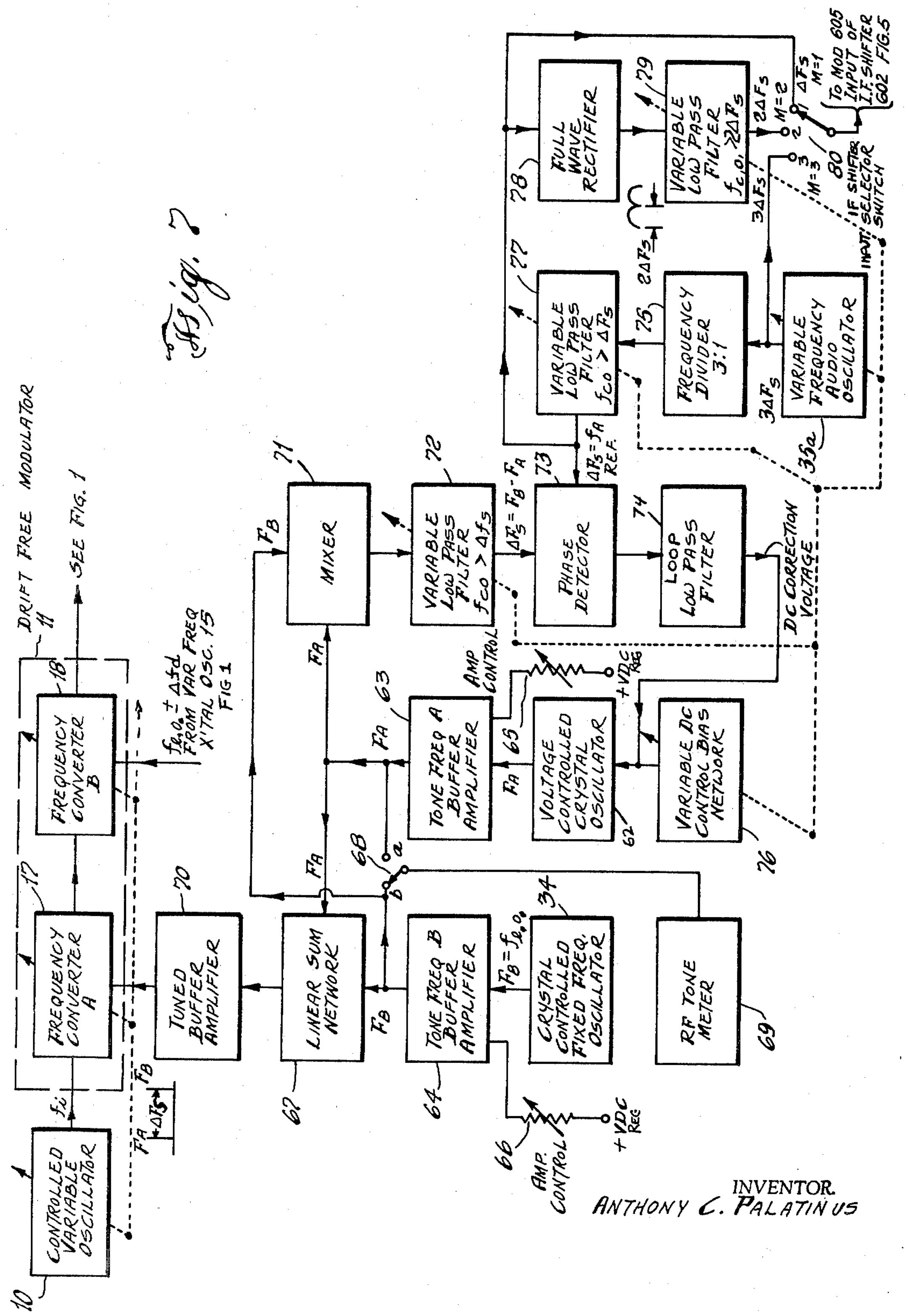
Figure 8:
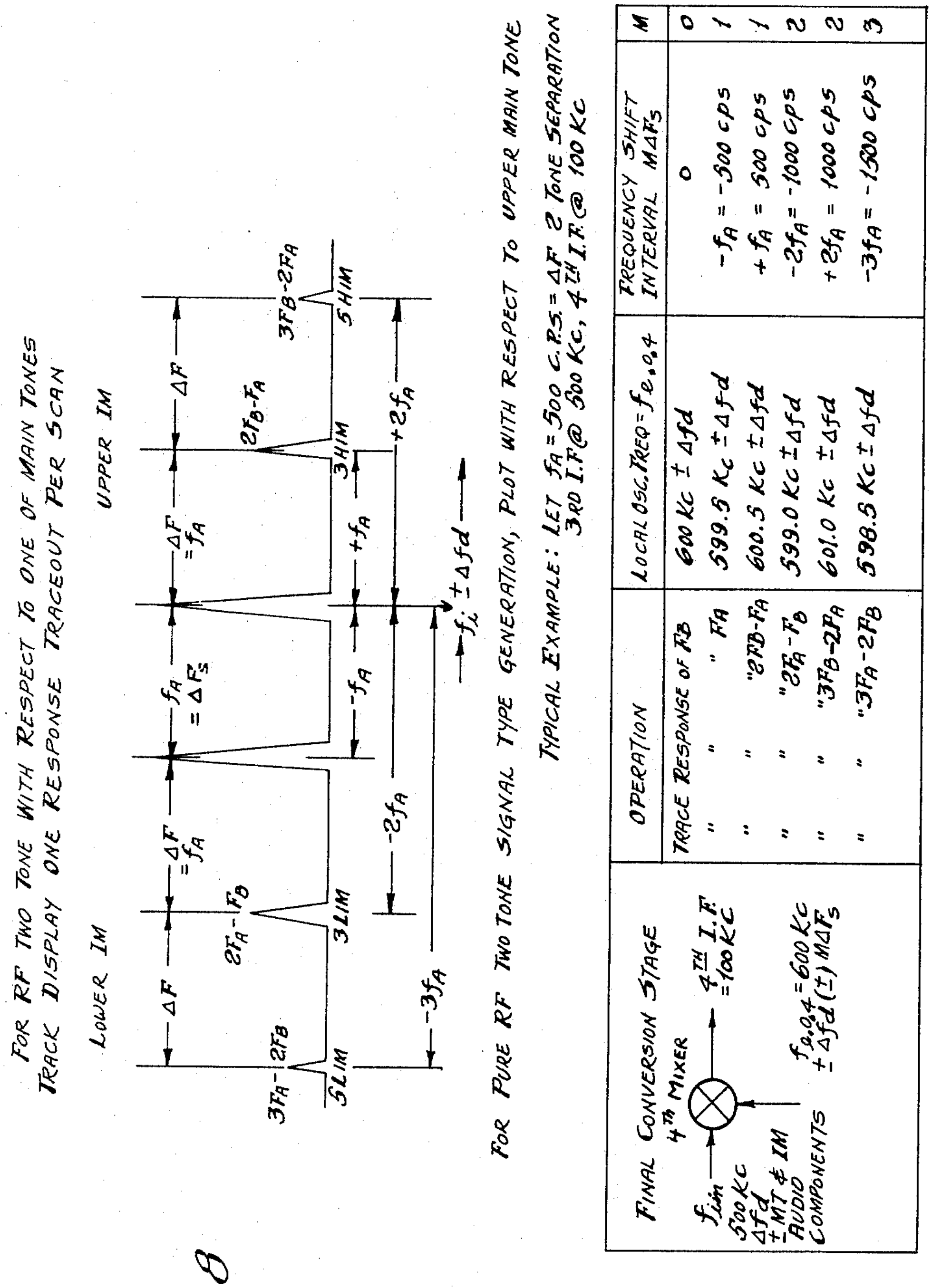

FIGS. 5*a* and 5*b* are a detailed block diagram of the output analysis section of FIG. 1;

FIG. 6 is a spectrum representation and typical example chart of system operation for the DSB type two-tone source;

FIG. 7 is a detailed block diagram of a pure RF two tone type generation and audio frequency division tuning of the output analysis section of FIG. 1; and, FIG. 8 is a spectrum representation and includes a typical chart of system frequencies encountered where a pure RF two tone type source is employed in the embodiment of this invention.

OVERALL OPERATION

The "intermodulation spectrum analyzer" test system which at times may be referenced herein as "ISA" is shown in an *elementary overall* system block diagram form in the illustrated embodiment of the invention as represented in FIG. 1. The overall function concept constitutes a circuit arrangement which may conveniently be divided into two main sections: the test signal source section 1, and the output analysis section 2.

To aid in obtaining a complete understanding of the technique of intermodulation spectrum analysis of this invention, the detailed description thereof shall be considered in the following order and manner:

(1) Description of the overall system in elementary form (FIG. 1).

(2) Detail description of the test signal source section 1, (FIGS. 2, 3, 4), (3) Detail description of the output analysis section 2, with illustrative examples (FIG. 5 and 6) and (4) Detailed description of an alternative embodiment of pure RF 2 tone generation and audio frequency division tuning, with illustrative example (FIGS. 7 and 8).

Referring now to FIG. 1, the test signal source section 1, serves to provide the desired test signal to the input of the unit under test 200, and also simultaneously provides seven operating signals to output analysis section 2.

In addition to the RF two tone-swept output signal, section 1 internally supplies the following operating signals for the output analysis section 2:

(*a*) A selectable frequency controlled signal output, $f_1$, of controlled variable oscillator 10, which signal functions as the reference frequency for variable oscillator 4.

(*b*) A crystal controlled, sweep frequency modulated local oscillator output signal ($f_{1.o.}\pm\Delta f_d$), which also is supplied internally to frequency converter B18 of drift-free modulator 11. Here $f_{1.o.}$ represents the center frequency value of the voltage swept variable frequency crystal oscillator 15, which is being frequency modulated in a linear manner with time by the sawtooth voltage applied to its voltage sensitive modulating element from the sawtooth voltage generator 13. The frequency deviation output is expressed as $\pm\Delta f_d$. Operating signal (*b*) is being applied to the IF frequency converter B21 of frequency shift local oscillator stage 6 in the output analysis section 2. This signal then functions to aid in novel frequency shift conversion process for the selection of the desired main tones and IM terms of interest and simultaneously allows for the sweep frequency removal operation.

(*c*) The linear sawtooth sweep synchronizing voltage output of the sawtooth generation stage 13 is applied to the horizontal deflection plates of the CRT indicator 8 and constitutes the synchronized time base of the test system.

(*d*) The crystal controlled fixed frequency signal, $f_{1.o.}$ supplied by fixed frequency crystal oscillator 16 which also is supplied internally as the carrier signal to balanced modulator 14. Signal (*d*) is being applied to IF frequency converter A20 of IF drift-free modulator 19 in the output analysis section 2. It therein functions in the drift-free IF modulation process, (*e*) The audio frequency signal output, $\Delta F_s$, of variable frequency audio oscillator 9 supplied as the modulating signal to balanced modulator 14. Signal (*e*) is also being applied to variable audio frequency multiplier 23 of frequency shift local oscillator 6 in the output analysis section 2. It therein functions to allow for the precisely required audio frequency tuning of the shift oscillator 6.

The remaining two supplied signals are derived from controlled variable oscillator 10 but in less precise applications requiring other than a full frequency synthesized embodiment, these two signals may likewise be supplied by separate crystal oscillators.

These two signals are:

Signal (*f*) which is of frequency $f_{IF3}$ and is supplied for phase locking purposes to frequency controlled variable frequency oscillator 4 of the output section, and signal (*g*) which is of frequency value ($f_{IF3}+f_{IF4}$) and is simultaneously supplied as the quiescent IF input signal to the IF shifter 22 and IF drift free modulator 19 of shift oscillator 6.

The stabilized RF two tone swept-in-step with time test signal applied to the unit under test 200 may be generated in two differing ways. Such a test signal can be a linearly combined pure RF two tone signal wherein the main tone frequency location is exhibiting a frequency sweep variation in a linear fashion with time while the two tone frequency separation is maintained constant. This type of test signal generation is described in detail herein with reference to FIGS. 7 and 8.

At this point, the description is directed toward a test signal which is essentially a double sideband suppressed carrier (DSB–SC) amplitude modulated wave, wherein the suppressed carrier frequency location is itself exhibiting a frequency sweep variation in a linear time manner while the frequency spacing of the tones is constant.

To understand the signal process involved in the generation of such types of test signals and similarly the derivation of the required internal operating signals, refer now to the circuit arrangement shown within the test signal generation section 1 of FIG. 1. A stable high frequency signal $f_1$ is generated by the frequency controlled variable oscillator 10, which may be any suitable stable variable frequency oscillator such as that associated with a crystal frequency synthesizer and is applied over two separate paths. One path supplies $f_1$ as the input signal to the drift-free modulator 11. Over the other path $f_1$ if directly supplied as operating signal (*a*).

In an alternative manner, the signal $f_1$ of controlled variable oscillator 10 may be supplied as the local oscillator signal for the first frequency converter of drift-free modulator 11, with the other signal to the converter than being the input signal. For convenience of description, signal $f_1$ is being assumed as the input signal.

Input signal, $f_1$ to frequency converter A–17 of drift-free modulator 11 is therein mixed with another input signal obtained from the output of balanced modulator 14. The local oscillator signal, designated $f_{1o}$, has been set to be equal to the quiescent frequency value $f_{1o}$ of the crystal controlled variable frequency oscillator 15, and within the drift free modulator 11, any frequency discrepancies between these two generated signals, including their frequency drift is therein minimized.

The audio amplitude modulating signal $\Delta F_s$ is applied to balanced modulator 14 input from the output of variable frequency audio oscillator 9. The modulated output of the balanced modulator 14 thus is a double sideband-suppressed carrier wave of singletone modulation, and such a waveform is known to be similar to a two tone type signal. The two RF tone frequencies appearing at the output of the balanced modulator 14 are the lower sideband tone of difference frequency product, ($f_{1o}-\Delta F_s$) and the upper sideband tone of sum frequency product ($f_{1o}+\Delta F_s$) and wherein the local oscillator signal ($f_{1o}$) applied, is balanced out so that it is heavily suppressed in the modulator output.

The two sideband frequency signals in the output are of equal amplitudes and a symbolic representation of their spectrum is shown at 14*a*. Here the frequency separation interval, which is the difference between the two frequencies is twice the single tone modulating frequency, of $2\Delta F_s$.

Drift-free modulator stage 11 essentially functions to produce at its output the combined modulation of AM and FM with respect to the applied input frequency value of $f_1$ from controlled oscillator 10. Accordingly the double sideband modulation is translated to about the $f_1$ value as the suppressed carrier frequency, and the sweep frequency modulation thereupon transferred to about the $f_1$ value as the quiescent center frequency value of the sweep modulated wave output.

For synchronization, the sweep modulation voltage is of the linear sawtooth type and is generated from sawtooth voltage generator 13. It is applied to vary the frequency of variable frequency crystal oscillator 15, which variation results in the equal deviation of the center frequency $f_{lo}$ by an amount designated $\pm\Delta f_d$, in a linear manner with time.

The DSB signal output of balanced modulator 14 heterodyned with input signal $f_i$ in the 1st mixer operation of modulator 11. Therein, either the sum or difference frequency product is filtered and the output subsequently applied to frequency converter B18.

The 2nd heterodyning operation within modulator 11 takes place with the sweep frequency modulated signal output $f_{lo}\pm\Delta f_d$, of swept oscillator 15. Thereupon, the resultant 2nd filtering action within modulator 11 produces either the difference or sum frequency product, which is predetermined in accordance with the 1st filter output product selection. Thus, the signal generation output from the converter B18 of modulator 11 is delivered to the conventional RF output stages 12 and constitutes a composite signal of a sweep frequency modulated wave, having a center frequency location of $f_i$ and a linear frequency deviation about this center frequency value of $(\pm\Delta f_d)$. The equal amplitude tone frequency components are symmetrically located above and below the instantaneous frequency location that is being varied linearly with time by equal audio frequency interval and such that the two tone frequency separation of the double sideband signal is maintained constant throughout the scan cycle. The frequency separation is variable and selective as determined by the setting of audio oscillator 9 which may be varied after subsequent scan cycles.

The output stages 12 amplify, set, and monitor the desired drive level test signal output to be applied to the unit under test 200.

The response output of the unit under test 200 to the subject test signal constitutes RF main tones and intermodulation components resulting from non-linearities of the test device that are symmetrically positioned about an instantaneously varying mean frequency location that is expressed as $(f_i\pm f_d)$. This spectrum then becomes the input to the output analysis section 2. The input spectrum is applied to frequency converter 3 which is also receiving a local oscillator signal of stabilized frequency $(f_i+f_{IF3})$ from controlled variable frequency oscillator 4. As mentioned earlier, controlled variable oscillator 10 is supplying its output frequency $f_i$ as a reference. Accordingly the tuning of oscillator 10 and modulator 11 is mechanically coupled with the tuning of frequency controlled VFO4. The tuning of controlled VFO4 is set to be at frequencies above the tuning of oscillator 10 by a fixed frequency amount equal to the 3rd I.F. frequency value, i.e. $f_{IF3}$. An internal automatic frequency control (AFC) loop within the controlled VFO4 thereupon acts to stabilize and control the local oscillator signal output of VFO4 at a value of $f_{IF3}$ above the reference input of $f_i$.

The 3rd I.F. value of frequency converter 3 is set for the difference frequency product of the two applied signals. The resultant output of converter 3 thereby becomes the spectrum content under examination which is now translated and centered about a frequency location expressed as $f_{IF3}\pm\Delta f_d$. The translated output is applied to sweep frequency removal and resolving frequency converter 5 which is receiving its local oscillator signal from frequency shift local oscillator 6. As mentioned earlier, the sweep frequency modulated output expressed as $(f_{lo}\pm\Delta f_d)$ is being supplied to the frequency shift oscillator 6. The shift oscillator 6 performs two functions. One function, accomplished by the use of I.F. drift-free modulator 19, is to transfer the sweep frequency deviation $(\pm\Delta f_d)$ being generated to about a new center frequency value that is greater than the 3rd I.F. frequency value by an amount equal to the 4th I.F. frequency value or $f_{CF}$ now$=(f_{IF3}+f_{IF4})=f_{lo4}$.

The other function, which is achieved using variable audio frequency multiplier 23 and I.F. shifter 22 is to bring about the frequency shifting of this new center frequency value by selected audio frequency amounts of $\pm M\Delta F_s$ upon successive scan cycles of the test system. The $\Delta F_s$ interval is predetermined and thereafter selected with M being any integer. The mechanical coupling of the $\Delta F_s$ range selection of shift oscillator 6 is made with the tuning of audio oscillator 9, while the individual setting for the particular M factor of interest is by way of a separate tunable control. Considering first the heterodyning operation between the two sweep frequency modulated inputs to the converter 5, the two signals are of identical sweep frequency deviation and direction but of differing center frequency value by an amount equal to the 4th I.F. value. The output of converter 5 is set to be highly selective about the 4th I.F. frequency value which is the quiescent difference frequency product of the two heterodyned waves. Accordingly over the course of the sweep frequency interval, the instantaneous frequencies of the two waves at all times differ by the fixed I.F.4 value, and this process results in the resultant translation of the spectrum under analysis to be statically centered about the 4th I.F. frequency.

I.F. drift-free modulator 19, like drift-free modulator 11, consists of two frequency converters which are receiving the same two local oscillator signals as modulator 11 except the amplitude modulation is omitted. Thus, I.F. frequency converter A20 has applied to it the CW signal $f_{lo}$, while I.F. frequency converter B21 receives the swept frequency signal $f_{lo}\pm\Delta f_d$. The input signal to modulator 19 is supplied by I.F. shifter 22 and is $f_{IF4}+f_{IF3}(\pm)M\Delta F_s$. With the audio frequency shifting intervals being of relatively narrow range, the two converters of modulator 19 are fixed tuned to the predetermined I.F. values of interest. In a like manner of operation as modulator 11, modulator 19 produces an output, where the frequency deviation $\pm\Delta f_d$ has been transferred to about its input signal frequency. The subsequent shifting of the input frequency to modulator 19 is brought about by the combination of frequency multiplier (XM)23 and I.F. shifter 22. Multiplier 23 selectively supplies an audio modulating signal to I.F. shifter 22 which is the desired 1M factor term of the $\Delta F_s$ signal at its input. I.F. shifter 22 has a signal of frequency $(f_{IF4}+f_{IF3})$ applied to it and thereupon supplies at its output the input signal and the upper and lower sideband of $\pm M\Delta F_s$ value about its input, which by suitable switching allows for the desired polarity selection of upper or lower sideband representative of plus or minus direction.

For $M=0$, the 4th I.F. value $(f_{IF4})$ becomes the mean frequency location of the translated main two RF tones and their associated intermodulation components, that is, the 3rd high and low, and 5th high and low odd order terms, and thus no actual signal component exists at the $f_{IF4}$ location. Now to secure component responses without changing the tuning of any of the other oscillators, the shift oscillator is manually offset by intervals of $M\Delta F_s$ either in the positive or negative direction via the independent polarity selector control of I.F. shifter 22 and the tuning of audio multiplier 23.

Thus, upon separate, and if so desired successive and sequential, scan cycles of the sweep frequency system, for $M=1$, then $+\Delta F$ shift occurs and the main upper tone component is located at the 4th I.F. position which is to be thereupon resolved by a highly selective filtering action from nearby frequency components. For $-\Delta F$, the main lower tone component is thereby positioned at $f_{IF4}$. Likewise for frequency shift intervals of plus and minus $3\Delta F$, the upper and lower 3rd odd order difference frequency I.M. components respectively are resolved. Similar action occurs for $M=5$, with shifting by $\pm 5\Delta F$. For resolution of the 5th I.M. terms.

Detector and deflection amplifier stages 7, which may be of linear or of log detection type as desired, detects any component response at the $f_{IF4}$ location and amplifies this response to a suitable level for application to the vertical plates of CRT indicator 8 in a conventional manner. As mentioned earlier, the sweep synchronization voltage from sawtooth generation stage 23 is being applied to the horizontal plates of CRT indicator 8.

Accordingly a visual display results on the CRT screen and for a scan cycle a pattern is plotted, whereby the vertical or amplitude response represents the relative magnitude of a particular spectrum component being analyzed and the horizontal or frequency excursion represents the frequency location at which the particular amplitude response is occurring.

TEST SIGNAL SOURCE SECTION

Figure 2:
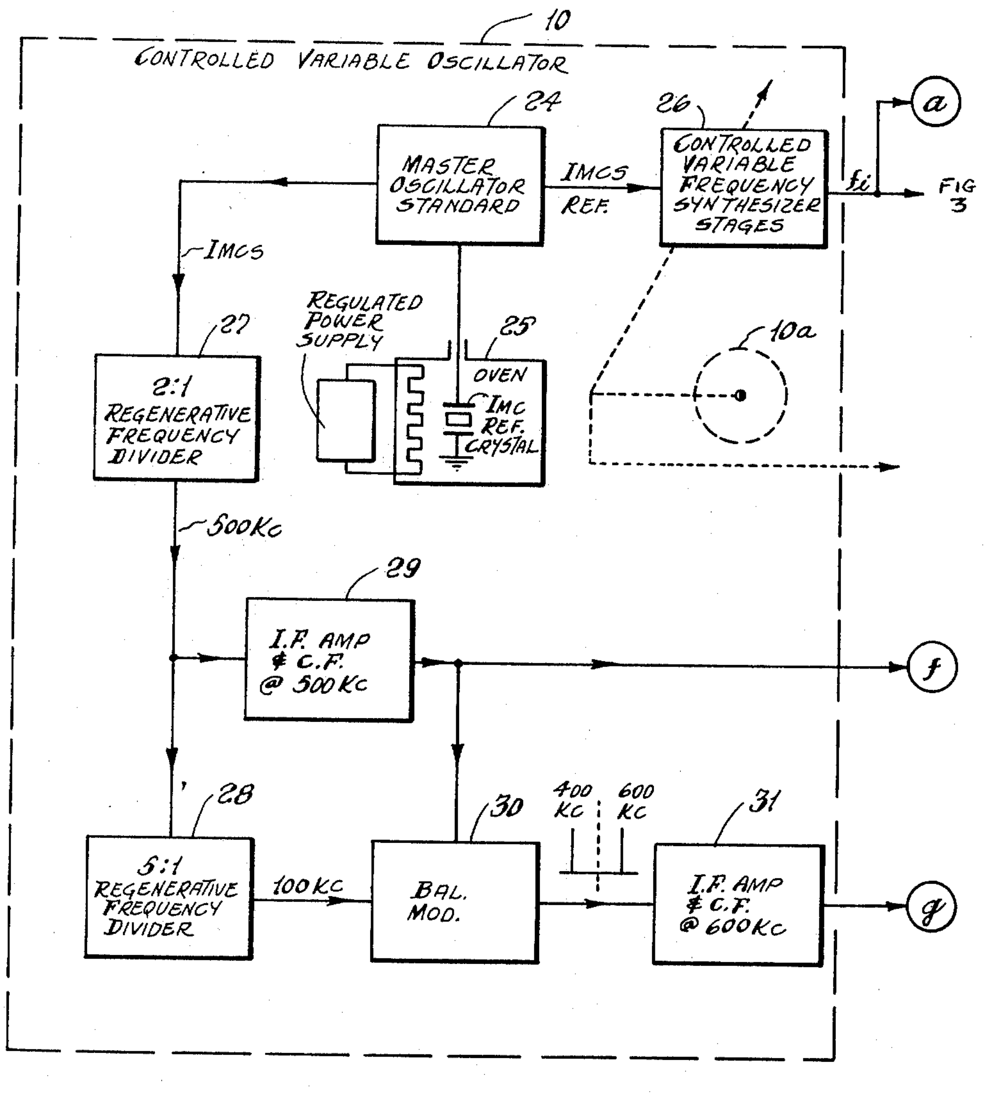
FIG. 2 is a block diagram of a variable frequency stable source employed in the embodiment of this invention.
Figure 3:
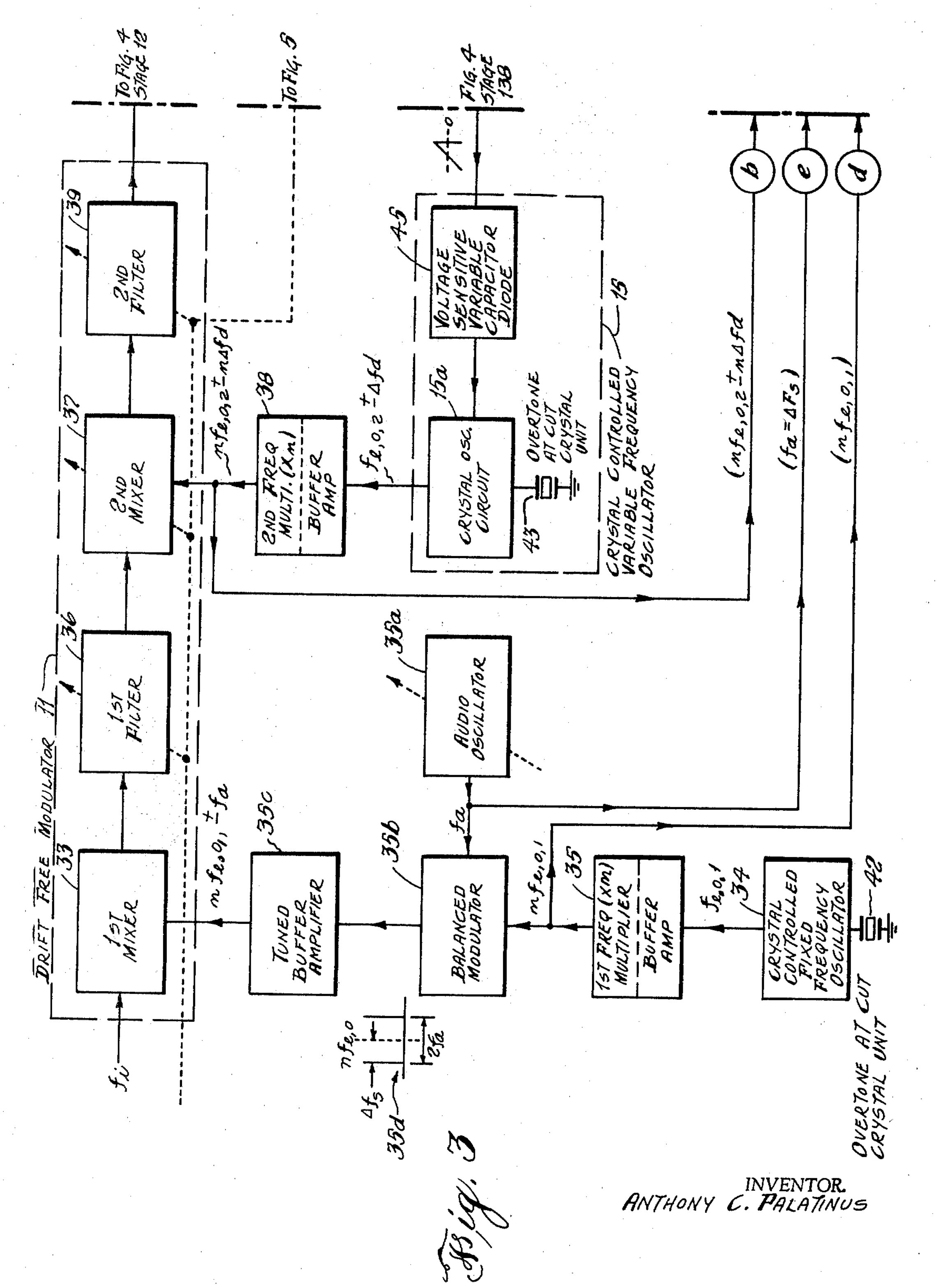
FIG. 3 is a block diagram of an amplitude modulated suppressed carrier sweep frequency modulator employed herein.
Figure 2:
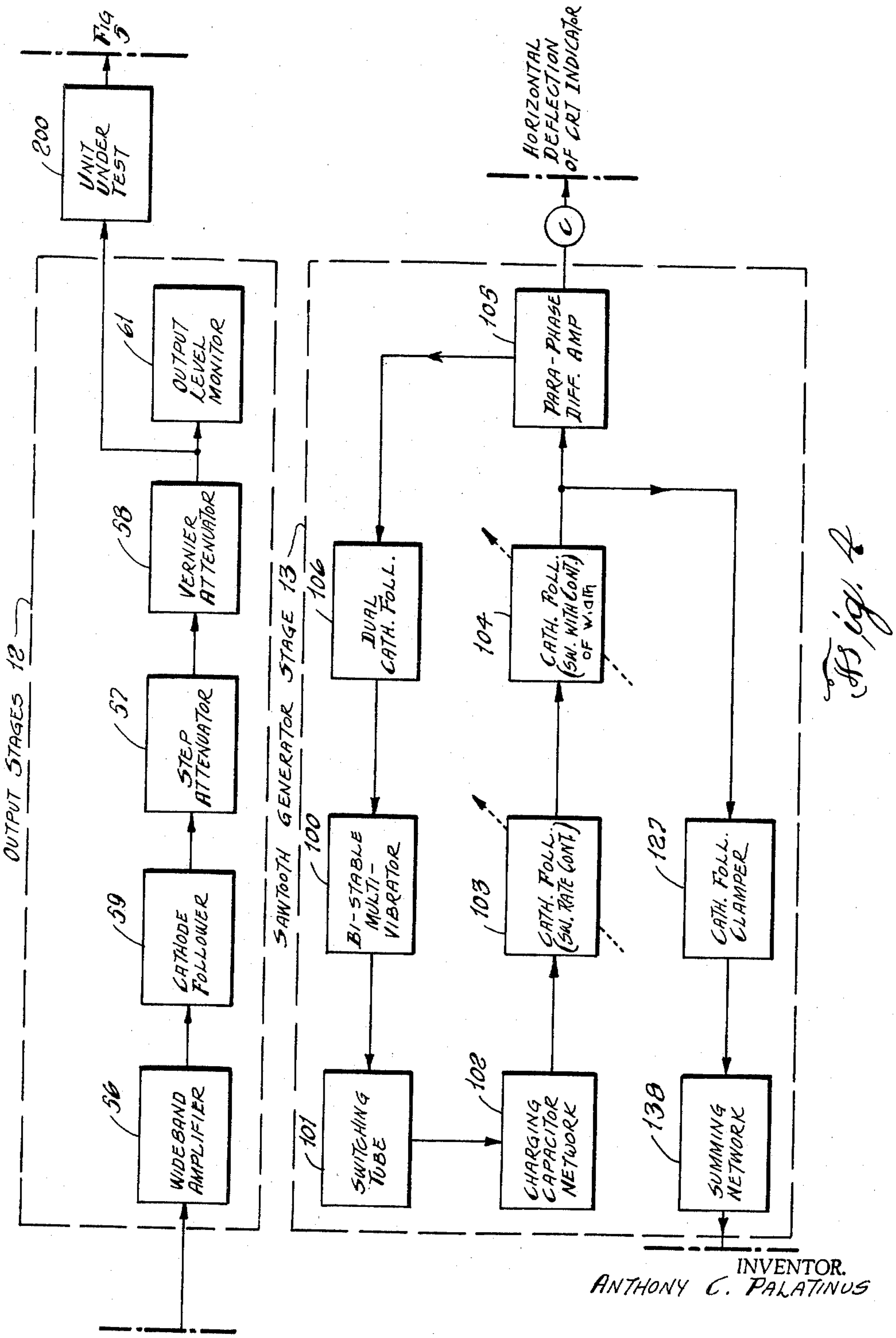

The practical embodiment of the test signal source section 1 is shown by the further detailed block diagram of FIGS. 2, 3 and 4.

The frequency controlled variable oscillator 10 is shown in simple block diagram form in FIG. 2 since a more detailed illustration would serve no useful purpose in that crystal frequency synthesis represented by the block is well known and that various frequency synthesizers are readily available.

In essence, the heart of such controlled variable oscillators is a master oscillator standard 24, which is temperature compensated as for example, one whose reference crystal is temperature controlled by an oven 25 with a conventional heater and a regulated power supply. For example, it is assumed that the master oscillator standard 24 has a 1 mc. reference frequency, which is conventional.

The 1 mc. reference signal is supplied to the controlled variable frequency synthesizer stages 26, where therein, in conventional manner, the frequency synthesizer output $f_1$, is being continuously monitored against the reference signal resulting in the automatic adjustments of the frequency selecting components to thereby insure exactly selected and equally stable frequency generation at the output.

Suffice it to say that a synthesizer as generally described will cover several frequency ranges which may be chosen by design, where each range is made up of a great number of single frequency channels or discrete signals separated from each other by a fixed number cycles (100) and where each generated frequency in effect is correlated to that of the master crystal oscillator 24. Present techniques allow nearly infinite frequency channel control with local operation of a direct reading frequency indication readout dial 10*a*. Thus the generation of a selectable spectrum of closely spaced frequencies, the stability and accuracy of which are controlled by crystal controlled master oscillator 24, insures the availability of a highly stabilized selectable frequency over a wide range which herein is to constitute the center frequency $f_1$ value of the generated sweep frequency output.

The 1 mc. signal is also applied to regenerative 2:1 frequency divider 27 which thereby produces an output of 500 kc. The 500 kc. signal is fed over two paths. One path leads to the input of 5:1 regenerative frequency divider 28 and the other path being to the input of I.F. amplifier 29. 5:1 divider 28 produces a 100 kc. signal at its output. I.F. amplifier 29, having its center frequency value at 500 kc. amplifies and passes the 500K c.p.s. signal from 2:1 divider 27. Amplifier 29 output is applied over two paths, one path to be supplied as signal (*f*) (see FIG. 1) to the output analysis section 2, and the other path feeding the 500K c.p.s. signal as the carrier input signal to balanced modulator 30. With the 100 kc. signal from 5:1 divider 28 as the input modulating signal to modulator 30, the resultant double sideband output is then the sum frequency product of 600 kc., and the difference frequency product of 400 kc. I.F. amplifier 31 in the output path of the modulator 30 has its center frequency at 600K c.p.s. and passes only the sum product component of 600K c.p.s. to be thereafter supplied to the output analysis section as signal (*g*). Signals (*f*) and (*g*) which may be derived by different conventional manner than so described, are required to allow full synthesizer control of the test system being herein disclosed.

Referring now to FIG. 3, the output or center frequency which will hereinafter be designated as $f_1$ of the controlled variable oscillator 10 (see FIG. 1) is fed over two paths. One path is into one input of the mixer stage 33. The other path is to supply $f_1$ as a reference frequency input to the frequency controlled VFO4 of the output analysis section 2 and its function is to be further discussed in the descriptive paragraphs on the output analysis section.

Mixer stage 33 also receives a local oscillator signal input that is a two tone RF signal comprising in one embodiment tone frequencies $f_1$ and $f_2$, which are the lower and the upper side band components respectively of a double-sideband suppressed carrier modulated (DSB-SC) signal. In an alternative embodiment (FIG. 7), that will be detailed in later paragraphs, the two tone RF signal then comprises pure RF tone frequencies of $f_a$ and $f_b$ that are linearly combined. Considering now the DSB–SC generated local oscillator signal, wherein the carrier signal is originated in crystal controlled fixed frequency oscillator 34 whose output frequency of $f_{101}$ is controlled by overtone AT cut crystal unit 42. Output frequency $f_{101}$ may undergo frequency multiplication where required in being applied to 1st frequency multiplier-buffer amplifier 35. Multiplication factor X*n*, where $n=1, 2, 3$, etc. is set in accordance with "*n*" selection of 2nd frequency multiplier-buffer amplifier 38. Multiplier-buffer amplifier 35 output of N $f_{101}$ thereby becomes the carrier frequency signal which is fed to balanced modulator 35*b* and therein undergoes amplitude modulation by an audio frequency signal, $f_a=\Delta F_s$ from stable variable frequency audio oscillator 35*a*. The resultant modulated output from balanced modulator 35*b* is the conventional double sideband wave with the carrier signal being readily suppressed in conventional balanced modulator by say 60 db.

Multiplier-buffer amplifier 35, like multiplier-buffer amplifier 38, comprises a tuned amplifier that is operated or driven beyond its normal operating point. Acting also as a buffer amplifier to the crystal controlled carrier frequency source, the tuned amplifier is overdriven and it generates thereby harmonics of the applied frequency at its output. The circuit output is tuned to pass a bandwidth including the desired harmonic frequency which may be any "*n*" harmonic (e.g. 2nd, 3rd . . .) plus the multiplied sweep frequency deviation in the case of multiplier 38. The degree of multiplication or the setting to a particular harmonic depends on the frequency range of interest, amount of frequency sweep or deviation and the stability required. That is, once the frequency range generated by controlled oscillator 10 is selected, the mixing frequency (output of multiplier) is to be determined and depending on the operating range of the crystal oscillators supplying the mixer and the frequency deviation range desired, the degree of multiplication is fixed. The selectively characteristics of the multiplier's passband is designed such that all the unwanted harmonics and frequencies developed within the multiplier are greatly attenuated while the passband is maintained flat for the maximum frequency bandwidth generated by the modulation process to avoid attenuation of any significant sideband frequencies.

Where the selected center frequency range from controlled variable oscillator 10 is relatively low in frequency as compared to the frequencies generated by the crystal controlled local oscillators themselves and the maximum sweep frequency dispersion desired is capable of being directly produced by the sweeping of the crystal controlled variable frequency oscillator 15, then the frequency multipliers 35 and 38 may be eliminated for the proper frequency mixing relation at the mixer stages. For this case, the balanced modulator 35*b* is then set to readily suppress the unmultiplied carrier frequency and produce the DSB modulation at its output.

The audio oscillator 35*a* may be of any conventional type and preferred examples are the decade frequency selectable, R–C bridge "T" or "R–C" phase shift type oscillators. Oscillator 35*a* may generate an audio frequency sine wave signal from say 100 cps. to several Kc and to aid in the description of this system's operation, an audio frequency output value of 500 cycles per second will be used merely for illustrative example purposes.

With the output of multiplier 35 being the carrier input to balanced modulator **35*b* and with variable frequency audio oscillator 35*a* providing the amplitude modulating signal input to the modulator then a detailed analysis of this double sideband suppressed carrier generation may be found on page 541 in "Radio Engineering," 4th edition by F. Therman published by McGraw-Hill Co. Generally, in amplitude modulation, the amount of energy within the sideband components is depedent upon the percentage of modulation that occurs. For 100 percent depth of modulation, double sideband generation results and the subsequent amplitude level of the two sideband components are equal. The double sideband output of balanced modulator 35*b* with lower tone $f_1$ of frequency $(Nf_{lo1}-f_a)$ and upper tone $f_2$ of frequency $(Nf_{lo}+f_a)$ as shown at 35*d*, is applied to tuned buffer amplifier 35*c*. Buffer amplifier 35*c* is of fixed tuned bandwidth about the center frequency value of $nf_{lo1}$ and relatively flat over the bandpass region of at least $\pm\Delta F_s$ maximum, where $\Delta FS=f_a$ and passes only the double sideband signal. The output of amplifier 35*c* is applied to mixer 33 and its level is set to be much greater than the input signal to the mixer from controlled oscillator 10** such that a linear relationship is maintained between the mixer input and output levels.

The output of first mixer 33 is applied to input of first filter 36, wherein the center and difference frequencies are suppressed, while the sum frequency sideband including the double sideband modulation components is permitted to pass through and feed into the input of second mixer 37. First filter 36 maintains a flat bandpass region at least wider than twice the maximum audio modulating frequency obtained from audio oscillator 35 a plus twice the maximum amount of multiplied frequency drift, that is expected to be encountered in the generation of the frequency $(nf_{lo1})$. The other input to second mixer 37 originates in crystal controlled variable frequency oscillator 15, which acts in the manner of a frequency modulator in that its frequency deviation from its quiescent value is directly dependent on the magnitude and polarity of the voltage input applied to its modulating element. Oscillator 15 comprises crystal oscillator circuitry **15*a*, overtone AT cut crystal unit 43 as its controlling crystal, and voltage sensitive variable capacitor diode 45 as its modulating element. Oscillator 15 generates a quiescent, or rest frequency $f_{lo2}$ set to be equal to that of crystal controlled fixed frequency oscillator 34 and in order to attain the same stability, equally stable crystal units are used for crystals 42 and 43**.

It is to be pointed out that in actual practice oscillator 34 may be of any well known high frequency or very high frequency crystal oscillator configuration wherein only the overtone crystal units 42 and 43 need be similar in construction having quartz plates being of AT cut design.

Let us here for the moment assume that the input voltage to the variable capacitor diode 45 of oscillator 15 is such that the linear frequency deviation so generated at oscillator 15 output extends in equal small amounts both below and above its quiescent frequency value and denote this frequency excursion with time as $(\pm\Delta f_d)$. This swept signal frequency is then applied to 2nd frequency multiplier-buffer amplifier 38, the output of which can then be expressed as $(nf_{lo2}\pm n\Delta f_d)$. This signal is applied over two paths as a local oscillator signal. One path is as signal (*b*) to the I.F. second mixer of the I.F. drift-free modulator 603 in the output analysis section 2 of FIGURE 5.

Over the other path, this signal is fed to mixer 37 as its local oscillator signal and is of proper level to establish a linear relationship between mixer 37 input and output. Second mixer 37 output is applied to the input of second filter 39 wherein the resulting difference frequency products are permitted to pass and all other frequency signals are rejected. The bandpass region of second filter 39 is relatively flat and uniform over a bandwidth that is at least as wide as twice the maximum sweep frequency deviation $(2\times N\Delta f_{fd\ max.})$ developed by the multiplied crystal controlled variable frequency oscillator 14 output.

The first and second filters, 36 and 39 respectively may be of conventional design wherein their variable tuning elements are coupled to provide the proper tuning of each filter simultaneously in a ganged arrangement with the other tunable elements of the test system as shown. It is evident that since first a sum frequency was obtained by mixing with a frequency identical to one of the second mixer components although swept with the difference frequency of the 2nd mixing thereof, the resultant output is a swept form of the original center frequency $f_i$ including the double sideband modulation. Although the first filter passed only the sum while the second only the difference this operation could be reversed with equally satisfactory results. For a further understanding of the double heterodyning operation, consider now the frequencies present at various points in the drift-free modulator 11. The input to the first mixer 33 consisting of $f_i$ at one point and $f_o$ multiplied $n$ times in the multiplier 35 an amplitude modulator by an audio sine wave $f_a$ in balanced modulator **35*b***.

The double sideband output, passed and amplified by tuned buffer amplifier **35*c* consists of lower sideband or tone $f_1$ that can be expressed as $(nf_o-f_a)$, and the upper sideband or tone $f_2$ as $(nf_o+f_a)$ with the frequency separation between $f_1$ and $f_2$ being twice the audio modulating frequency or $(2f_a)$. Thus the other input to mixer 33 from the output of tuned buffer amplifier 35*c* constitutes RF frequency components $(nf_o\pm f_a)$. The resultant output of the first mixer 33 therefore, being components $f_i$ and $[f_i\pm(nf_o\pm f_a)]$. The first filter 36, which is tuned to the sum frequency product, and which may be a tunable RF amplifier stage, produces an output frequency of $[f_i+(nf_o\pm f_a)]$ which appears at the input of second mixer stage 37. The variable frequency oscillator 15 generates a crystal controlled frequency modulated signal that is deviated by its modulating signal voltage input, a linear sawtooth waveform. The sweep modulated output may be represented by the term $(f_o\pm\Delta f_d)$, where $f_o$ is the quiescent frequency and $\Delta f_d$ is the deviation of the frequency about $f_o$. This swept frequency signal is passed through multiplier 38 of identical multiplication factor "$n$" as multiplier stage 35 and the output becomes the other input to the second mixer 37, namely, $(nf_o\pm n\Delta f_d)$. The heterodyne operation in second mixer 37 results in an output comprising frequency components $[f_i+(nf_o\pm f_a)]$ and $\{[f_i+(nf_o\pm f_a)]\pm nf_o\pm n\Delta f_d]\}$. This output, after being filtered in the second filter 39**, which may also be a tunable RF complifier tuned to the difference frequency product, and readily suppressing all other components is then $$[f_i+(nf_o\pm f_a)]-[nf_o\pm n\Delta f_d] \text{ or } [(f_i\pm f_a)\pm n\Delta f_d]$$

It is here evident that in effect the double sideband modulation components have been translated to a carrier frequency value of $f_i$ and likewise the variable oscillator 15 has been transferred to the stable, accurate center frequency $f_i$ generated by the controlled oscillator 10.

The swept frequency output now has a practically driftless center frequency $f_i$ without the need of automatic frequency control or the use of additional complex correction circuitry.

In measuring intermodulation spectra in actual amplifiers, it is often desired to make such measurements at several drive levels, since the relative levels of the intermodulation components are found to be sensitive to the drive level applied. Variation and setting of the particular selected drive levels at the test signal source section 1 output is obtained from the output stage arrangement 12 shown detailed in FIG. 4. Thus, the output of filter 39, which may be either a sweep modulated center frequency about which a two tone signal is displaced, or a pure CW sweep modulated output signal, is applied to a conventional series of output processing stages 12. The wide band amplifier 56 and the other output stages are of common conventional design well known to those skilled in the art. The amplifier 56 permits the amplification of a wide band of frequencies so that the system is capable of power output over an extended range. In order to accurately control the output level independent of frequency, a step attenuator 57 and a vernier attenuator 5 for fine control are provided. The cathode follower stage 59 serves to match the amplifier 56 output impedance to the lower attenuator impedance and to properly isolate the stages from each other. For RF monitoring, the output level stage 61 is included as the last stage.

Now to further illustrate the value of the double heterodyning process in the invention and disregarding for the moment the suppressed carrier amplitude modulation, consider the practical existence of a minute equal amount of positive drift in the local oscillators 34 and 15 to be designated $+e$. Then with the signals applied to the first mixer 33 being frequencies $f_i$ and $(nf_o+ne)$ with $nf_o$ being a greater value than $f_i$. Now, in this case, the first filter selects the difference frequency product, which is $[(nf_o+ne)-f_i]$, and becomes one input signal to the second mixer 37. The other input to mixer 37 is the multiplied sweep frequency modulated signal $[nf_o \pm n\Delta f_d]$, and likewise the added multiplied drift $(ne)$. With the second filter set to select the difference frequency, the resultant output becomes $$[nf_o \pm n\Delta f_d + ne] - [(nf_o + ne) - f_i] = nf_o \pm n\Delta f_d + ne - nf_o - ne + f_i = f_i \pm n\Delta f_d$$

This process fully describes the operation and unique features of drift-free modulator 11 as used in test signal source section I, and it is equally applicable with respect to I.F. drift-free modulator 603 located and operated in the output analysis section 2 of FIG. 5.

At this point, since drift-free sweep frequency modulation is required in the test system, a further description of crystal controlled variable frequency oscillator 15, along with its sweep voltage control, is given.

As stated earlier crystal controlled variable frequency oscillator 15 is crystal controlled by overtone AT cut crystal unit 43 which, for drift-free purposes, is similar to overtone AT cut crystal unit 42 that is controlling the fixed frequency of oscillator 34. Such crystal units as 42 and 43, both being of AT cut quartz crystal plate design and operated in an overtone mode, are known to have temperature-frequency characteristics whereby the frequency drift which may occur in each one will be in similar direction of change and very nearly of the same magnitude. Important use is made of this factor in the double mixing process whereby the drift occurring in oscillators 34 and 15 thereby is cancelled and the ultimate system stability is therein achieved without the need of operating crystals 42 and 43 under temperature controlled conditions, as for example in crystal ovens.

The overtone type of crystal operation generally employs the third or the fifth mechanical harmonic of the fundamental frequency of the AT cut quartz crystal plate. A typical example of such an oscillator, useable as oscillator 15, is the overtone crystal oscillator described in the article "Overtone Crystal Oscillator Design" by George H. Lister on pages 352 to 358 of "Electronics for Communications Engineers" published in 1952 by McGraw-Hill Book Co.

This crystal oscillator design makes use of the fact that an overtone crystal unit having a low parallel resonant impedance may be operated as a high impedance circuit element when used in conjunction with an inductance to form an impedance inverting type network within the oscillator input grid circuit. The crystal oscillator utilizes the characteristic of the piezoelectric crystal unit to appear as capacitive impedance when it is energized at some frequency below its actual series resonant frequency. Since the crystal's impedance is capacitively reactive in the narrow range below its resonant frequency, then by shunting it with an inductively reactive impedance and applying the input to the grid of an electron tube, there is formed an anti-resonant parallel grid circuit having high impedance. By providing the crystal unit with shunting inductance of a sufficiently high magnitude, and shunting with the variable capacitance diode 45 in the case of the variable frequency oscillator 14, the total combination is adjusted so that it is anti-resonant at the quiescent operating frequency, $f_{io2}$, of the crystal controlled variable frequency oscillator 15. Hence it is noted that crystal unit 42 directly oscillates at frequency value $f_{io1}$ within oscillator 34, thereby having its series resonant or parallel-resonant mode in accordance with oscillator configuration used exactly at the frequency to which its plate is cut, that is, frequency is set at value $f_{io1}=f_{io2}$. Crystal unit 43 on the other hand has its design resonant frequencies, that is its series and parallel resonant points set to be at frequency values slightly higher than the output frequency value of $f_{io2}$ from crystal controlled variable frequency oscillator 15. Nevertheless crystal unit 43, in oscillating at frequencies in the region below its actual series resonant frequency, still continues to exhibit its frequency stabilizing properties with respect to the oscillator 15 swept frequency output. Hence with the exact frequency setting of $f_{io1}=f_{io2}$, then the subsequent stabilization of these frequencies thereafter follow in accord with the like stability characteristics of crystal units 42 and 43. With this oscillator 15 circuit arrangement, when operated over a narrow region about the quiescent frequency, $f_{io2}$ there exists a linear relationship between either the changing of the inductance value or the varying of the capacitance and the resulting frequency change at the output of the overtone crystal oscillator. In this embodiment as shown in oscillator 15, the inductance is maintained constant while the capacitor diode 45 is changed to vary the generated frequency at oscillator 15 output. Voltage sensitive variable capacitor diode 45 is the modulating element of oscillator 15 and does not exhibit hysteresis effects, adverse tube effects, circuit damping or reactance simulation experienced from other useable elements such as ferrite variable reactors or reactance tubes. Capacitor diode 45 is set to operate over a narrow linear portion of the curvature of its well known dynamic characteristic curve.

In being sensitive, voltage controlled capacitor diode 45 undergoes a linear capacitive change as the linear sawtooth voltage is applied to it, whereby such capacitance changing results in a linear frequency deviation at the output of oscillator 15. Thus the entire oscillator 15 arrangement including crystal 43, capacitor diode 45 and their associated circuitry 15*a*, operates as a sweep frequency modulated crystal overtone crystal oscillator.

Further details of this configuration of crystal controlled variable frequency oscillator 15, are known to the art. However, it may be observed that in an embodiment of suitable design in accordance with the illustrated and described test system similar use can be made of such available form of voltage controlled crystal oscillators (VCXO's), as the Itek Electronic Corp., Model 10M–VCXO or the model 30B1 manufactured by Midland Wright Division of Pacific Industries, Inc.

Sweep frequency modulation is known to differ from conventional sinusoidal frequency modulation in that the center frequency of the sweep modulated waveform is an information bearing component. When the swept frequencies are applied to various test devices, and the resultant response output is to be synchronized with the modulating voltage on a CRT screen, it is thereafter intended that the center of the visual display represent the center frequency value of the applied wave.

In the precise signal processing, such as obtained by the illustrated embodiment and disclosed and described herein, where controlled variable oscillator 10 is conventionally of the frequency synthesizer type and drift-free modulator 11 is being used, the specific setting and control thereafter of the start and stop positions of the linear sawtooth waveform, in a highly repeatable manner, about an average DC level, which may be zero, is required. Hence, such an operatiional performance of the sweep voltage source is necessary to thereby secure the drift-free linear sweep frequency modulation at the output of drift-free modulator 11.

Referring now to the block diagram of FIG. 4 and in particular to the sawtooth generation stages 13 there is shown a bistable multivibrator 100 which may assume either of two stable conditions, as for example, no output, and a steady voltage output level dependent on the input thereto. Under one of these conditions the switch tube 101 is caused to assume a non-conducting state and a B+ voltage is applied to resistor-capacitor circuit 102 which has an extremely long time constant. The high quality capacitor of the Mylar type is charged only during a small portion of its total time constant range so that the charging excursion relationship with time is quite linear. The linearly increasing voltage change or sweep build up across the capacitor of circuit 102 is passed through a series of cathode follower circuits 103 and 104 and then applied to the input of paraphase differential amplifier 105. The output of amplifier 105 serves to change the state of the multivibrator 100 by way of dual cathode follower 106 and thereby initiate discharge of the capacitor to complete one cycle of the linear sawtooth, and the linear sawtooth output is also externally applied as signal (*c*) to the horizontal deflection plates of a CRT indicator 8.

Thus, within the closed loop arrangement the linear sawtooth waveform is being fed back to precisely establish and thereafter recurrently control the start and finish positions of the positive going linear voltage excursion through the repeated triggering action it exerts on the bistable multivibrator 100, which is controlling the switching process.

Separate variable potentiometers in the cathode circuits of cathode followers 103 and 104 allow for the setting of the sweep width, and thereby the sweep frequency dispersion, and for the sweep rate, and thereby the frequency excursion time, respectively.

Bear in mind that the above elementary description is for narrow band linear sweep frequency modulation, where the voltage sensitive capacitor diode 45 and the charging capacitor of circuit 102 are operated only over a small linear portion of their dynamic characteristics. The generating stages of the closed loop, that is stages 100 through 106, thereby produce a stable cyclic recurrent linear sawtooth voltage that is applied to the horizontal plates of CRT indicator 8 and in part to capacitor diode 45, as is conventional practice in the art.

The positive going sawtooth appearing at cathode follower 104 output is fed through the cathode follower clamper 127 which clamps the sawtooth base or low potential to absolute zero potential using back to back diodes, wherein the diodes reference the clamper output to zero by returning one of the diodes to the potential derived from the forward conduction of the other diode. The output of this clamper is applied to the summing network 138. The summing network may be purely resistive with no coupling capacitors and therefore a sawtooth wave form of low repetition rate may be employed. Although this network may attenuate the signal somewhat, the signal voltage may be raised in the prior circuits to compensate for this loss and the fact that the preceding low impedance output cathode follower was used minimizes any coupling losses and provides good isolation. Since the input sawtooth was clamped to zero it possesses a D.C. component voltage which must be eliminated otherwise the voltage driving the diode 45 voltage sensitive modulating element would create a sweep frequency centered about some frequency different from the intended quiescent frequency (zero voltage input).

Selection of the proper bias or bucking voltage is made within the summing network 138 from Zener diode regulated DC voltages since for different settings of the control potentiometers varying sweep width and sweep rate, new DC levels exist. The output of summing network 138 applied to voltage sensitive variable capacitor diode 45 is then a linear balanced sawtooth voltage waveform about the zero level.

It is to be recognized that the function of the closed loop sawtooth generating stage 13 including the summing network stage 138 may be readily met by other closed loop time base generators known in the art that electronically control their sweep rate repeatability.

As an example similar use can be made of such a closed loop type time base generator as shown and described in detail in my patent application, "Direct Indicating Spectrum Analyzer," filed July 11, 1963, now Patent No. 3,304,494.

Another suitable example of a sweep voltage generator is shown and described in the article "Linear Sawtooth Sweep Generator Has Constant Amplitude, Recovery Time" by I. M. Beddoes, published in Canadian Electronics Engineering, February 1962.

Particular details of an embodiment of the test signal source section 1 made in accordance with my invention have been described and the overall operation of the signal generating system will now be reviewed.

In the arrangement shown, the sweep modulating voltage, which in general may take any desired wave shape such as linear sawtooth, squared sawtooth, or triangular depending on the generating circuitry which, for operation within the present method and test system invention is shown as generating, at the output of stage 13, a linear sawtooth type wave that is applied to the voltage sensitive capacitor diode 45 and thereby controlling the frequency deviation of the crystal controlled variable frequency oscillator 15. This linear sawtooth voltage as described is of a direction to produce an increasing frequency with time at oscillator 15 output. This is best illustrated by considering the following example. The frequency $f_i$ generated by the controlled variable oscillator 10 is selected such that it is lower than the quiescent unmodulated frequency $f_o$ of variable oscillator 15. Then the sweep deviation, when modulated by a sawtooth, starts from a frequency below $f_o$ and increases with time to a maximum (at end of sweep) greater than $f_o$. With the center frequency $f_i$ selected, then the resultant quiescent frequency output at filter 39 can be varied. In other words, the capacitance of the modulating element 45 decreases with time as the sawtooth is applied. This in turn produces an oscillator 15 output of increasing frequency, which after the second filter (difference) 39, results in a center ($f_i$) swept frequency which is also increasing frequency-wise with time. The output of the paraphase amplifier 105 is such that its voltage is increasing positively with time in synchronization with the sweeping frequency output. This permits the application of the paraphase amplifier output to be applied to the horizontal deflection plates of CRT indicator 8 to provide a beam scan while the swept frequency signal or its test response equivalent may be placed across the vertical plates so that a simple and direct one to one relationship is established. Under these conditions knowing the center frequency $f_i$ from the dial readout of controlled variable oscillator 10 and bandwidth of the sweep, a correlation on the scope screen can easily accurately be made so that where a particular event occurs on the screen it may be identified with a particular known frequency. For example as the output (sweep frequency) of the last stage 58 (FIG. 4) is applied to some device 200 which is to be evaluated relative to its frequency response, the resultant signal detected and placed on the vertical plates and with the paraphase amplifier output to the horizontal plates, then the response of the device may be instantly observed over the entire swept frequency spectrum on the CRT screen. In this connection it should be observed that the swept frequency output is jitter-free and an extremely narrow band-sweep width is obtainable. Later in fact, it will be seen that by disabling the phase lock controlled tone oscillator in the case of pure RF generation and the sweep modulating voltage, a CW signal appears at the system output. Where the response characteristics of narrow band devices are considered, such as quartz crystals, a narrow band sweep is essential in order to permit observance of extremely close responses. Hence where the responses or characteristics are close together with respect to frequency, the generating system of this invention due to its excellent frequency stability and accurately controllable sweep voltage allows for very slow sweep rates and narrow frequency bandwidth, and thus it is essential for good resolution to be achieved in the output analysis section 2.

Typical suitable frequencies for the drift-free modulator 11 may be say 2–30 mcs. range for frequencies from controlled variable oscillator 10, and say 49 mcs. for the local oscillator frequencies to 1st mixer 33 and 2nd mixer 37. Filter 36 would then be tunable, considering sum product selection, from 51 to 79 mcs., and the drift-free modulator 11 output becomes the difference frequencies of 2–30 mcs. possessing the double sideband and sweep frequency modulation.

Although covering the range of 2–30 mcs., by way of example, the illustrated embodiment of the test signal source section 1 may have its range extended into the UHF region through selection of such a frequency synthesizer of that range and proper setting of the multiplication factor *n* in a suitable design.

OUTPUT ANALYSIS SECTION 2

The "analysis" section 2 of FIG. 6 handles the RF spectrum output of the device under test 200 in response to the RF two tone swept-in-step type test signal input. At any one instant in time, this test signal input represents a two tone RF test signal which is well known in the art and effectively serves to statically aid in determining the intermodulation distortion that is introduced by the degree of non-linearity of the device under test. For stages possessing 3rd or 5th degree of curvature, and generally designated as "quasi-linear" stages, odd order (3rd, 5th, 7th) intermodulation products are produced at the output of the stage, and are of the most concern.

A two-tone type test source as delineated herein is an extremely versatile instrument when the two frequenices are varied linearly in time over a wide range. As the transfer function of a device to be tested normally varies with the absolute frequencies of the test tones, it is desirable to measure intermodulation distortion where the absolute frequency value of each tone changes but their difference frequency remains constant.

The static test signal of two frequency components, each of equal amplitude, known as a two tone intermodulation test signal, can be expressed as $$e(t)=E \cos W_{at} \cos W_{ct}$$

where $W_a$ is one half the difference and $W_c$ is the average, for the waveform respectively, of the two input angular frequencies. The envelope of this input signal is given as $E(t)=E \cos W_{at}$, and the resultant output envelope due to test device 200 non-linearities is expressed as $$e_o(t)=E_o(t) \cos W_{ct}$$

wherein $$E_o(t)=2A_1 \cos W_{at}+2A_3 \cos 3W_{at}+2A_5 \cos 5W_{at}+ \dots$$

with the quantities $A_1$, $A_3$, $A_5$ . . . expressing the amplitude spectrum of the RF output. Hence $$E_o(t)=A_1 \cos (W_o+W_a)t+A_1 \cos (W_o-W_a)t$$
$$+A_3 \cos (W_o+3W_a)t+A_3 \cos (W_o-3W_a)t$$
$$+A_5 \cos (W_o+5W_a)t+A_5 \cos (W_o-5W_a)t+\text{etc.}$$

In obtaining data of this nature for high frequency, narrow band stages or devices where useable bandwidth is small compared to the operating frequency, only odd-order difference frequency intermodulation products need be considered since the even order products produce distortion only at frequency locations far outside the band of the system being used.

To secure, with great stability, high accuracy and extreme selectivity, the resolution, analysis, and frequency tracking of any one individual component of the response spectrum that is experiencing amplitude changes in its frequency excursion through the bandwidth of the device under test, the output analysis section 2 functions in conjunction with the required operating signals supplied from the above described test signal source action 1 to thereby plot the amplitude-frequency characteristic of such response components.

The analysis operation takes place in the following described manner:

The variable attenuator 131 reduces the response output signal to the proper input level for the frequency converter 3 heterodyne operation since substantial amplification of the test signal being applied may occur in the device under test 200.

Frequency converter 3 functions to frequency translate the RF spectrum output of the device under test to about a pre-determined 3rd I.F. frequency of say 500 kc. The 3rd mixer 132 has its local oscillator source frequency value. $f_{lo3}$, set to be 500 kc. greater than the referenced center frequency value, $f_i$, of the test signal being applied. Thus $f_{lo3}= f_i+500$ kc. or in general $f_{lo3}=f_i+f_{IF3}$, and the 3rd I.F. amplifier 140 at mixer 132 output is fixed tuned to select the difference frequency product of the 3rd heterodyning operation. A closed loop phase-locking frequency control circuit arrangement, comprises frequency controlled variable frequency oscillator 4.

This control loop consists of variable frequency local oscillator 133, 5th mixer 134, 5th fixed I.F. amplifier 136, phase detector 135, low pass filter 137, frequency discriminator 138 and voltage controlled variable reactance 139, and is used to precisely maintain I.F. of 500 kc. frequency separation between the center frequency of the incoming response spectrum and the local oscillator signal applied to frequency convertor 3.

This AFC loop operates in the following conventional manner:

The controlled variable oscillator 10 signal output, $f_i$, is applied to the 5th mixer 134 input as the reference input frequency of the control loop. The variable frequency local oscillator 133, which is shown gang tuned to the main tuning dial 109 to set its nominal frequency to be 500 kc. above the selected frequency, $f_i$, supplies its local oscillator signal to the 3rd mixer 132 and to the 5th mixer 134. The output of the 5th mixer 134 heterodyning operation is bandpass tuned to the difference frequency of the two signals being applied. Thus, 5th I.F. amplifier 136 in the 5th mixer output has its center frequency value at 500K c.p.s. and its bandpass region is of bandwidth suitable to permit lock-in within range of the frequency control loop.

The difference frequency output signal is then applied simultaneously to phase detector 135 and frequency discriminator 138, whose center or zero frequency value is 500 kc. The subsequent discriminator 138 output functions as the DC correction signal that is being applied through low pass filter 137 to a voltage controlled variable reactance 139, which may be a voltage variable capacitance diode. The variable reactance is associated with the tuning network of the variable frequency oscillator 133 and coacts therewith. This action produces a fine adjustment of the frequency being generated in accordance with the polarity direction and amount of DC voltage correction being applied from the output of frequency discriminator 138 to thereby automatically control the frequency being generated at 500 kc. above the supplied reference frequency value, $f_1$.

Phase detector 135 receives its reference frequency input of 500 kc. as signal (*f*) from controlled variable oscillator 10. Discriminator 138 thereby functions to bring the 500K c.p.s. signal output of amplifier 136 within the narrow capture range of the phase control loop. The DC correction voltage output of phase detector 135 is also applied thru low pass filter 137 to thereby control the variable reactance 139 and bring about the phase locking of the 500 kc. frequency to the reference 500 kc. frequency value of signal (*f*).

Loop low pass filter 137 stabilizes the gain characteristics of the frequency control loop. Conventional AFC tuning indicator and defeat means, not shown with the essential stages of the block diagram, would in practice be normally employed in the conventional manner. This operation thereby results in the highly stabilized frequency conversion of the incoming spectrum to about the predetermined 3rd I.F. of 500 kc.

The signal output of variable frequency oscillator 133 applied to mixer 132 is relatively of much larger amplitude as compared to the input level to this mixer, and a linear relationship is thereby maintained between the input and output signal amplitudes of converter stage 3.

At this point, it is notable that use may now be made of a less complex controlled variable oscillator 10 than the frequency synthesizer initially described and signal (*f*) may be supplied by a separate crystal oscillator.

As mentioned earlier, a frequency synthesizer used as controlled oscillator 10 is mainly intended to function in such applications where a high degree of accuracy and stability is desirable for the frequency axis of the plotted response or where very long sweep time intervals are required such as in X–Y graphical recording.

The spectrum output of 3rd I.F. amplifier 140 is shown sketched at 140*a*, and is the input signal to 4th mixer 141. Note that since an input sweep frequency deviation direction of $(\pm n\Delta f_d)$ is assumed, and the local oscillator frequency $f_{lo3}$ is set to be greater than the input mean frequency of $f_1$, then frequency reversal occurs for the difference frequency output whereby the sweep direction of the deviation about the new mean frequency of $f_{IF3}$ is reversed and becomes $(\mp n\Delta f_d)$.

It is a feature of the invention that the sweep frequency removal and frequency shift operation takes place at a single heterodyne stage within the test signal path. This capability is highly advantageous in those applications where a minimum number of heterodyning operations is desired within the signal path, since as illustrated herein only two conversion stages are required.

In the above described embodiment, the frequency controlled variable frequency oscillator 4 may cover the high frequency range of 2.5–30.5 mc. with the resultant I.F. at 500K c.p.s. In other bands of operation, for example, resultant I.F. at 10 mc. would well be applicable for the VHF region of 30–300 mc., while a 30 mc. I.F. is satisfactory for the UHF range above 300 mc. However, as will be evident to those experienced in the art, an additional stabilized frequency conversion stage would be necessary for the output analysis section 2 in the path between the two illustrated frequency conversion stages 3 and 5 of FIG. 8 for those applications where the ultimate in resolution is desired.

The 4th and final heterodying operation within the test signal path combines the functions of frequency shift conversion and sweep frequency removal, and subsequently filters out the desired information for display as selected. The sweep frequency removal process will be first considered. This process essentially consists of heterodyning two signals having an equal amount and similar direction of sweep frequency dispersion, i.e. while the center frequency value may be different, the mixed signal output will only constitute at all times, the difference or sum product frequency of the two heterodyned waves, or $[(f_{lo4}\pm n\Delta f_d)=(f_{IF3}\pm n\Delta f_d)]$.

The selection of the difference product gives the result of $[f_{lo4}-f_{IF6}]$ which is pre-determined to be $f_{IF4}$ or say 10° kc. as shown in the block diagram.

Sweep frequency removal and resolving frequency convertor 5 thereby consists of 4th mixer stage 141 and the 4th I.F. resolving filter 149, and receives its local oscillator signal from the frequency shift local oscillator 6. Overall, frequency shift local oscillator 6 comprises an audio frequency multiplier 601, and I.F. shifter 602, and I.F. drift-free type modulator 603 which in itself consists of balanced modulator 144, narrow band I.F. amplifier 145, 6th mixer 146 and 6th I.F. amplifier 147.

For the moment, consider only the sweep frequency removal process. For this purpose, observe the functioning of I.F. drift-free modulator 603, which has applied to it three input signals, two of these being supplied from the test signal section 1. These two inputs, as mentioned in the description of the signal source section, are operating input signal (*b*) which is being applied to 6th mixer 146 as its local oscillator input, and operating input signal (*d*) which is being applied to balanced modulator 144 as the carrier input. The local oscillator signals being used in the double heterodyning operation of the I.F. drift-free modulator 603 are identical to the multiplied crystal controlled local oscillator frequencies of drift-free modulator 11 of the test signal source section 1. In this application, I.F. drift-free modulator 603, operating in a signal processing manner generally similar to that of drift-free modulator 11, precisely transfers the sweep frequency deviation of $(\pm n\Delta f_d)$ from about its quiescent frequency of $(nf_{lo2})$ to about the frequency value of the I.F. signal applied to the input of balanced modulator 144. In the illustrated embodiment balanced modulator 144 receives its I.F. input signal at signal (*g*) direct from the output of controlled variable oscillator 10, when main tone and intermodulation component selector switch 604, designated MT and IM selector, is in position O. As has been pointed out in the description of the frequency stabilization of frequency controlled variable frequency oscillator 4, this I.F. local oscillator signal frequency, which in the given example is set to be 600 kc., can be likewise supplied from a separate crystal controlled oscillator. However, it will be seen that in the synthesizer controlled embodiment, the invention apparatus of the test system may well be remotely programmed and thereby performs in a highly automatic manner with required precision.

Since in this case the input, I.F. signals applied to I.F. drift-free modulator 603 are made tunable over a narrow region of audio value ±MΔF, with $M=1$ thru 5, about the I.F. value of 600 kc., the filtering action of the double-hetrodyning process is fixed tuned. Accordingly, balanced modulator 144 receives as its input signal 600 kc. as shown and a carrier signal of $(nf_{lo1})$. Balance modulator 144 is set to readily suppress the appearance of the carrier signal component of $(nf_{lo1})$ in its output and this modulator's output is then mainly a double sideband signal of upper sideband component value $(nf_{lo}+600$ kc.) and lower sideband component value $(nf_{lo}-600$ kc.). Bal. modulator 144 output is applied to narrow band I.F. amplifier 145, which has its bandpass center frequency value at $(nf_{lo1}+600$ kc.) and with the bandwidth of its pass region being relatively flat at least (±5ΔF maximum) about the center frequency. As such, NBIF amplifier 145 passes only the sum product upper sideband component output of balanced modulator 144 and rejects the lower sideband and other frequency components. The passed output of I.F. amplifier 145, which is expressed as $$(nf_{1o1}+600 \text{ kc. } (\pm) \ M\Delta F_s)$$

is applied as the input signal to 6th mixer 146. The local oscillator signal to 6th mixer 146 as described earlier is expressed as $(nf_{1o2}\pm N\Delta F_d)$ where $(nf_{1o2}=nf_{1o1})$. The 6th I.F. amplifier 147 receives the output of 6th mixer 146 as its input signal with amplifier 147 having its I.F. bandpass region centered about 600 kc. and of flat bandpass region at least greater than $(\pm N\Delta f_d$ maximum$\pm 5$ $AF_s$ maximum) of the test system. Here the 6th I.F. amplifier 147 passes only the difference frequency product output of 6th mixer 146 and suppresses all over signals. The resultant output thereby becomes the fourth local oscillator signal $f_{1o4}$ applied to 4th mixer 141 and is expressed as $$f_{1o4}=[nf_{1o}+600 \text{ kc.}+M\Delta f_s]-[nf_{1o1}\pm n\Delta f_d] \text{ or } f_{1o4}=600 \text{ kc. } (\pm) \ MAF_s\mp n\Delta f_d$$

Accordingly the sweep frequency deviation of the test signal source section 1 of $(\pm n\Delta f_d)$ has been transferred about the local oscillator frequency of 600 kc., whereby the 600 kc. local oscillator frequency may be tunable or shifted by an audio frequency amount of $[(\pm MAF_s)]$ as selected. It is to be observed that the frequency reversal encountered in 6th mixer 146 operation gives a change of sweep frequency excursion from $(\pm n\Delta f_d)$ to $(\mp n\Delta f_d)$. The direction of frequency excursion of the translated spectrum output of 3rd I.F. amplifier 140 as described earlier is of identical frequency excursion with time, i.e. $(\mp n\Delta f_d)$. Accordingly in 4th mixer 141 operation, the difference frequency product between the two applied signals at any instant of time is always equal to a static or stationary spectrum with the sweep frequency excursion being negated or removed.

Hence, in the 4th hetrodyning operation where the 4th (final) filter 149 is tuned for the difference frequency product of the two signals applied to the 4th mixer 141, the subsequent result is as follows:

$f_{IF4}=100$ kc. as predetermined and in general $$f_{IF4}=f_{Io4}-f_{IF3}$$

$f_{IF4}=(600 \text{ kc.}\mp n\Delta f_d-f_{IF3})$ where ($f_{IF3}=500$ Kc.$\mp n\Delta f_d$ with tone signal being swept in step).

Hence: ($f_{IF4}=600$ kc.$\mp n\Delta f_d-500$K c.p.s.$\pm n\Delta f_d$ with 2 tone signal being swept in step or $f_{IF4}=100$ kc. and 2 tone signal static, wherein the static 2 tone signal as shown sketched is located about the 100 kc. ($f_{IF4}$) frequency value, with the main higher tone and lower tone (HTF and LTF) respectively are located above and below this I.F. frequency by frequency interval equal to the audio modulating frequency, $f_a$ of audio oscillator 35*a* in the source section 1. It is to be now noted that the 4th (final) resolving filter 149 is not being subjected to swept frequency modulated energy and has no bandwidth limitations imposed in order to avoid the phenomena known as "ringing" distortion found in the conventional scanning-type spectrum analyzer. Through use of the principle of one-to-one sweep frequency removal in the 4th heterodyning process, the resolving filter 149 may be set to have a highly selective bandpass region about the 100 kc. I.F. value, say for example a 10 c.p.s., 3 db bandwidth. For wide dynamic range the skirt selectivity of this resolving filter 149 is set sufficiently sharp providing at 60 db a base bandwidth of say 50 c.p.s. and at 80 db about 90 CYS. Such a resolving filter may consist of a number of cascaded filter stages, say three or more, wherein the series resonant mode of the 100 kc. crystal units are loaded by tuned L–C networks to establish the desired selectivity.

The swept frequency removal operation as described results in a non-spectrum sampling or non-frequency scanning translation of the incoming two tone swept-in-step spectrum under analysis. Thereupon the revolving filter 149 experiences only a static two tone plus intermodulation distortion components input, and it now remains necessary to precisely bring about the individual alignment of each of the static frequency components with the center frequency location of the exceedingly selective resolving filter in a rapid and repeatable manner.

Herein there is imposed no restrictions on the scanning velocity (sweep width, c.p.s.$\times$sweep rate c.p.s.) developed by the sweep frequency modulated source and essentially the test system affords 100 percent intercept capability for the analysis section 2 to detect and evaluate the spectrum content that is produced in the output of the device under test 200. Hence if information were to exist at the 100 kc. frequency value at 4th mixer output 141, it is subsequently detected by detector 150 either in a linear or log manner as selected, and amplified to the proper voltage level by vertical deflection (video) amplifier 151 for application to the vertical plates 153 of the CRT indicator 8 in the conventional manner. The linear sawtooth generator 13 output from horizontal deflection amplifier stage 105; which is the closed loop electronically controlled sawtooth waveform generated of constant, highly repeatable sweep rate in FIG. 4 that produces the sweep frequency modulation; also in synchronism develops the horizontal CRT beam deflection by being applied to horizontal plates 156 of the CRT indicator 8. Thus a response traceout on the screen is developed wherein the vertical coordinate axis of the CRT screen face is calibrated in db, and the horizontal base axis is calibrated either in a factored proportion of the sweep deviation, $\Delta f_d$, where $\Delta f_d=n\Delta f_d$, as established about the selected zero or center frequency value, $F_{cf}$, where $F_{cf}$=frequency value of the center of the band of the test device. Alternately it may be calibrated in terms of $\pm 50$ percent about the band center of the test device 200, where the total sweep frequency dispersion (in total sweep bandwidth$=2\times\Delta f_d$) is set to be equal to the total (100%) bandwidth of the device under test.

At this point, we will consider the details of the frequency shift conversion (FSC) process. The arrangement of the system as described up to this point is set to track information content in the spectrum output of the test device 200 that upon frequency translation appears in the output of the 4th mixer 141 as a 100 kc. signal. It is also to be noted that this particular circuit arrangement for double sideband type two tone generation, without frequency shift conversion prevents subsequent detection of 100 kc., content thus in this case, an output is not intended to appear. Here frequency shift conversion is also accomplished in the 4th heterodyning operation. This operation, without the frequency shifting feature, has been covered above in the description of the operation of the I.F. drift-free modulator 603. These additional stages, to bring about frequency shifting of the generated quiescent local oscillator frequency of 600K c.p.s. to the 4th mixer consists of audio frequency multiplier 601 and I.F. shifter 602 which both function to frequency shift the input signal frequency applied to I.F. drift-free modulator 603, and thus produce the equal shift at drift-free modulator 603's output to 4th mixer 141.

To accomplish this shifting, the exact audio frequency value of the required amount of frequency shift $M\Delta F_s$, where M may be equal to 1 through 5, is applied from the output of variable audio frequency multiplier 601 as the modulating signal input to I.F. shifter 602. I.F. shifter 602 is shown comprising I.F. balanced modulator 605, upper sideband filter 606, lower sideband filter 607, and the single pole, triple throw (SP3T) MT and IM selector switch 6°4. The signal (*g*) of 600 kc. crystal controlled frequency, is being supplied simultaneously to the zero "0" position of switch 604, and to I.F. balanced modulator 605 as its carrier signal input. With the audio frequency modulating signal input to balanced modulator

605 being designated $M\Delta F_s$, the resultant double sideband output of the modulator 605 constitutes an upper sideband term of (600 kc.$+M\Delta F_s$) and a lower sideband component of (600 kc.$-M\Delta F_s$), with the carrier signal at 600 kc. readily suppressed by the balanced modulator. The resultant output of the modulator is fed over two paths, one path being to the input of upper sideband filter 606 and the other path to the input of lower sideband filter 607. The sideband filters are of conventional design and may be of the mechanical resonator or crystal unit type well known to the art. Upper sideband filter 606 has a bandpass region that is flat from (600 kc.$+\Delta F_s$ min.) where $\Delta F_s$ min. may be say 100 c.p.s. to (600 kc.$+5\Delta F_s$ maximum), where $5\Delta F_s$ maximum may be say 5 kc. Filter 606 passes the upper sideband component in modulator 605 output, while the filter's sharp skirt selectively results in great attenuation at the 600 kc. carrier frequency and thereby readily suppresses all of the lower sideband frequencies from modulator 605's output. The selected upper sideband frequency of (600 kc.$+M\Delta F_s$) from filter 606 output is fed to the plus "+" position of switch 604. Lower sideband filter 607 has a bandpass region that is flat from (600 kc.$-\Delta F_s$ min.) to (600 kc.$-5\Delta F_s$ maximum) and thereby passes the lower sideband component and rejects the carrier frequency and the upper sideband component from modulator 605 output. The selected output (600 kc.$-M\Delta F_s$), of filter 607 is connected to minus "—" position of switch 604. Thus, the setting of selector switch 604 to the minus position gives an audio frequency shift of ($-M\Delta F_s$) to the quiescent 4th local oscillator frequency of 600 kc. at the 4th mixer 141. Similarly positioning switch 604 to the plus contact, results in shifts of ($+M\Delta F_s$). To complete the description of frequency shift local oscillator 6, it now remains to describe the operation of audio frequency multiplier 601 which is generating the audio shift frequencies of ($M\Delta F_s$) that are applied to I.F. shifter 602.

Audio frequency multiplier 601 functions to multiply by a selectable factor of M, where M=1, 3, 5, odd only for the double sideband type two tone generation and M=1, 2, 3, etc. for pure two tone type generation, the audio frequency ($f_a=f_A=\Delta F_s$) output of the audio frequency oscillator 35*a* of the test signal source section 1. The multiplier 601 essentially comprises a harmonic generator and a tunable selective audio amplifier. Considering multiplier 601 action in detail, the audio frequency output of audio oscillator 35*a*, which is of frequency $\Delta F_s$ c.p.s. is applied to the input of square wave shaper 608. Shaper 608 may be a sinewave clipper and develops a square waveform containing $\Delta F_s$ and all useful odd harmonics thereof at its output, which is fed to the DSB position of SPDT mode select switch 610. The output of shaper 608 is also fed into integration network 609 which operates on the square wave to produce at its output a sawtooth waveform that consists of ($\Delta F_s$) and all harmonic factors.

The output of the integrator 609 is connected to the "pure" position of select switch 610. The wiper of switch 610, which is shown in position DSB, is connected to the input of amplifier stages 611, which may be three stages of audio amplifiers 611*a*, 611*b* and 611*c*, connected in cascade. The output of stages 611 is applied over two paths, one path being to the input of variable gain audio amplifier 613; and the other path to the input of variable frequency selective network 612, which acts to feed back the output of stages 611 to its input in a negative sense. Accordingly, variable frequency selective network 612, which may be a passive, tunable, resistance-capacitance (R-C) bridge null arrangement, applies negative feedback for all frequencies except at the desired frequency value to which the network is sharply tuned, since nulling occurs thereat with minimum negative feedback. The selection of the particular "$M\Delta F_s$" signal from the applied harmonics is made, where the "M" factor is determined in accordance with the specific order intermodulation term, or fundamental main component, of the RF test response output to be analyzed and plotted. Thus frequency tuning of multiplier 601 is generally made independent of other tuning arrangements of the system. A calibrated frequency scale coupled with the tuning controls of variable selective network 612 aids in the rapid selective tuning to the required $M\Delta F_s$ frequency value to be selectively amplified. The required $M\Delta F_s$ frequency that is to be supplied may be determined from the calibrated dial indication of audio oscillator 35*a*. Thus the arrangement of amplifier stages 611 and tunable feedback network 612 functions as a frequency selective audio amplifier that produces an output only at the frequency to which it is tuned and sharply rejects all other frequencies being applied at its input. In the DSB mode, only odd factors M=1, 3, 5 of $\Delta F_s$ are obtained from the square wave being generated, while in the pure mode, all factors, M=1, 2, 3, etc., of $\Delta F_s$ are obtained from the sawtooth type waveform.

The output of frequency multiplier 601, which is the audio frequency signal ($M\Delta F_s$) from variable gain audio amplifier 613 output, is fed to the input of I.F. balanced modulator 605 of I.F. shifter 602. The audio output level is thereafter maintained at its proper value by adjustment of variable gain amplifier 613, which itself has a flat frequency response characteristic extending beyond the maximum ($5\Delta F_s$) value developed by the generating system. One then obtains a pre-calibrated meter reading by output level monitor device 61 of the test source 1, which can be switched (not shown), to monitor the voltage amplitude at the output of one of the sideband filters, either 606 or 607. Also this voltage monitoring in the course of multiplier 601 tuning may also aid in the rapid location and generation of the fundamental frequency $\Delta F_s$, and the subsequent selection of the harmonic factors desired thereof.

A typical test demonstrates more clearly the functional usage of the now fully described frequency shift local oscillator 6, which is highly stable and audio frequency tunable, as it serves to implement in a novel manner, the response plotting of the main and intermodulation component terms.

Refer now to FIG. 6 which is respresentative of a convenient example for the double sideband type generation. As noted in FIG. 1, the audio frequency output of oscillator 35*a* is then designated $f_m=f_a=\Delta F_s$.

For the DSB case, where amplitude plotting is made with respect to the instantaneous mean or carrier frequency value expressed as $f_i \pm n\Delta f_d$), the spectrum distribution is as shown sketched. In the elementary illustration given of the final conversion stage, there is expressed the two input signal relationships to the 4th mixer. The accompanying chart of FIG. 6 designates the actual quiescent frequency value of the local oscillator signal after shifting has occurred to obtain the particular response plotting of the main tone (HMT or LMT) or IM terms (3LIM, 5LIM, 3HIM, or 5HIM where L=lower, H=higher). For example, to trace out the response of the third higher or upper odd order intermodulation component, then the audio multiplier 601 of FIG. 5 is set for M=3 and tuned to select the 3rd harmonic of audio frequency $f_a$. For the given example of $f_a$=500 c.p.s., then $M\Delta f_a=3\times 500=1500$ c.p.s. The selector switch 604 of I.F. shifter 602 of FIG. 5 is set to the plus (+) position, and the initial 4th local oscillator, $f_{104}$, quiescent frequency value is shifted by +1500 c.p.s. to thereby become 601.5 kc. Then the resultant 4th I.F. output of 100 kc. here represents the 3rd HIM component of ($2f_2-f_1$) which is located $+3f_a$ or 1500 c.p.s. above the mean frequency of the test spectrum being analyzed. The other spectrum component terms are selected and plotted in an identical manner and the remaining numerical values of the given example are self-explanatory.

It is to be noted that frequency reversal may be encountered in a particular design of a multiheterodyne operation whereby the intermodulation spectrum distribution at the 4th mixer input is such that the upper tone and IM component terms are located below the mean frequency value with the lower main tone and IM terms being above.

For such conditions, polarity correction can be readily made to properly designate the particular main tone or IM term that is being measured by reversing the polarity convention of selector switch 604.

Overall, frequency shift local oscillator 6 thereby allows for the individual selection of the required frequency shifting intervals ($\pm M\Delta F_s$) in either direction as desired for the response tracking and traceout of the specified particular intermodulation test tone or odd order product term of the spectrum under analysis during a single or repeated scan interval of the sawtooth excursion cycle.

The audio modulating frequency, $\Delta F_s$ or $f_a$, herein referenced at 500 c.p.s., for illustrative purposes, is in practical application held to a range of values that may represent no more than but a few percent of the narrow bandwidth of the device being tested. Such operation effectively provides for the determination of the family of response curves representing the plotting of a specifically selected IM spectrum components versus the frequency bandwidth of the device 200 at a point of its frequency response characteristic curve rather than over a sizeable portion of the bandwidth to be frequency scanned. It should be observed that if it is desired to cover the entire bandpass of the device under test 200, then the frequency sweep of the test source may be greater, and in most cases at least that of the device bandwidth. Generally speaking, where the test device is a narrow band RF amplifier, say its bandwidth is of the order of 12 kc., in which case the frequency sweep deviation should be at least 6 kc. either side of the center or quiescent frequency. It is a featured characteristic of test system that only the single audio oscillator 35*a* governs the selection of $\Delta F_s$ as introduced at the test source as $f_a$ and also used as the fundamental frequency for the frequency shift intervals ($\pm M\Delta F_s$) required in the output analysis.

Another point of interest to be observed is that any resultant frequency drift discrepancy that may develop within drift-free modulator 11 is identically carried forth with the IF drift-free modulator 603 of the output analysis section such that exact cancellation occurs within the overall test system. Accordingly thereby the entire test system is stabilized and controlled throughout the entire scanning and plotting of a family of curves by a crystal frequency synthesizer used as controlled variable oscillator 10.

While the intermodulation spectrum analysis test system described produces a traceout on a CRT screen, the need often arises for a permanent X–Y pen and ink graphical recording of the sequence of intermodulation response characteristics of the device under test 200 over the selected bandwidth of interest. The invention system most aptly provides this advantageous capability when the full synthesizer controlled embodiment is implemented.

Accordingly, the output of video amplifier 151 is supplied to the "Y" axis input of a conventional X–Y recorder 152, and the sweep output voltage from the paraphase amplifier 105 of sawtooth generator stage 13 is applied and set to synchronize therewith the "X" axis excursion. Though the horizontal motional speed of graphical recorders are of slow rate, the combination of controlled sawtooth generation and drift-free sweep frequency modulation as noted in the description given in this specification insures the accuracy and repeatability of both the test signal source section 1 and the output analysis section 2 throughout such long sweep time intervals and the accompanying lengthy test times required to obtain the permanent graphical pattern that represents amplitude versus frequency characteristics of the main tones and resulting intermodulation components taken by way of separate plots.

So far the invented test system of this specification shown and described in detail in the above paragraphs has been based on the double sideband generation of the two tone RF signal. Consider now an alternative method of two tone generation and its novel use within the invention test system. As an added alternative of this embodiment, illustrated by the elements shown in FIG. 7, there is further innovation in implementing a frequency division method of audio frequency shifting of the frequency shift local oscillator 6 of the system rather than the previously illustrated and described audio frequency multiplication process of FIG. 5.

The provision of a distortionless frequency pair with each tone of equal amplitude or pure RF two tone generation is most readily accomplished through the use of separate stable tone oscillators which are isolated from one another by buffer amplifiers and their equal outputs being additively combined. The two separate tones follow distinct paths until they are linearly summed to form the well known two tone waveform.

Since these tones may be required at various frequency locations in accordance with the multiplication factor of the multiplier 38 for the sweeping frequency output, variable frequency multiplication (XM) may be applied to each singular tone. At this point, however, to simplify the subsequent description, the multiplication of the local tone oscillator's signals will be omitted.

Shown in FIG. 7, the embodiment as illustrated for the two tone RF local oscillator generation allows for a wide dynamic test range and the subsequent plotting of a family of IM characteristic curves, but in this test mode, it is with respect to one of the tone frequencies, either upper tone $F_B$ or lower tone $F_A$, of an RF two tone signal. The technique herein uniquely employed is based on the generation of a signal for use as the 1st channel local oscillator source that is a two tone RF signal of selectable audio frequency separation $\Delta F_s$ and wherein this frequency separation is phase locked through the use of an automatic phase control loop to reference audio frequency $f_a = \Delta F_s$. To understand the function and operation of this 1st local oscillator source consider the following detailed description in respect to FIG. 7.

Fixed frequency crystal controlled oscillator 34 remains as it was for the original drift-free modulator 11. Here, however, the frequency output of ($f_{lo1} = f_{lo2}$) is designated to be the upper main tone frequency signal of $F_B$ of the two tone generation. The lower main tone frequency of $F_A$ is separately supplied by voltage controlled crystal oscillator 62, which may be similar in construction and design to crystal controlled variable frequency oscillator 15 for modulator 11. This lower tone $F_A$ frequency is set at a nominal audio frequency separation interval ($\Delta F$) below upper tone $F_B$, which by way of example is, say, 500 c.p.s. and becomes the quiescent operating frequency of voltage controlled crystal oscillator 62, or ($F_B - 500$ c.p.s.). The frequency outputs of crystal oscillators 62 and 34, that is, tone frequencies $F_A$ and $F_B$ respectively, are applied separately to buffer amplifiers 63 and 64 respectively. Each buffer amplifier has an amplitude control, 65 for tone $F_A$ and 66 for tone $F_B$. Such amplitude control may be brought about by having a variable potentiometer adjustably feeding a positive potential from a regulated DC source +VDC, (not shown) to the screen grid element of the amplifier tube and serving to control the output amplitude.

The output signals of the tone buffer amplifiers are each fed over three paths. One path is to inputs of mixer stage 71, another path is to the inputs of conventional linear summing network 67. The remaining path is to the switch positions of single pole, double throw switch 68. The wiper of switch 68 is connected to RF tone meter 69. To secure an equal amplitude relationship for the two tone wave being formulated, switch 68 is positioned to monitor the tone amplitude output of buffer amplifier 63 by means of tone meter 69. Adjustment is made of amplitude control 65 to set the output level of tone A to a pre-calibrated marking on the meter scale. Then placing switch 68 into position B, the amplitude control 66 is varied to obtain the identical scale reading. The two RF tones of $F_A$ and $F_B$ are additively combined without distortion at the output of the linear sum network 67 to constitute the well known two tone RF signal. Summing network 67 output is fed as the input to tuned buffer amplifier 70 whose output signal is shown in the spectrum sketch. Amplifier 70 has its center frequency set at a frequency of $f_{101}$ and its bandpass region is relatively flat for a bandwidth at least greater than ($\pm\Delta F_s$ maximum$\pm\Delta E$ frequency drift). Tuned buffer amplifier 70 amplifies the combined signal to a suitable level for application as the local oscillator signal to 1st mixer 33. Controlled variable oscillator 10, 1st filter tuned RF amplifier 36 and 2nd mixer 37 remain unchanged from the description of these stages of the drift-free modulator 11. 2nd frequency multiplier-buffer amplifier 38 is shown only as a tuned buffer amplifier 38 since the multiplication process is being omitted for this descriptive explanation, namely $n=1$. The drift-free modulator arrangement properties delineated in this specification is also applied to fixed frequency crystal controlled oscillator 34 which generates tone frequency, $F_B$. To avoid the degradation of the advantageous drift-free principles of this test system being described, it is now required to provide the equivalent stabilization of the tone frequency $F_A$ being generated by voltage controlled crystal oscillator 62. Here use is made of the automatic phase control (APC) principles to accordingly bring about the frequency control of tone frequency $F_A$ with respect to the tone frequency signal $F_B$. One method of obtaining such operation is the heterodyning of tone frequency $F_A$ with tone frequency $F_B$ in a mixer and passing only the difference frequency product of $\Delta F_s$ by having a low pass filter at the mixer output cut-off slightly above this frequency value. The filtered difference frequency signal is then phase compared with a reference audio signal of exact desired $\Delta F_s$ frequency value and a DC error signal output is applied to the voltage controlled crystal oscillator generating tone $Fa$ to bring about phase lock in a conventional manner.

The reference signal $\Delta F_s$ is also supplied directly to a selector switch at the input of the I.F. shifter 602 of the output analysis section 2. Reference signal $\Delta F_s$ is also full wave rectified and its second harmonic or $2\Delta F_s$ is then fed to the selector switch. The $\Delta F_s$ reference signal itself is obtained by frequency dividing by a factor of three, the $3\Delta F_s$ frequency output of an audio variable frequency oscillator, which is also connected to the selector switch. This frequency division method of $\Delta F_s$ generation functions as replacement of the audio frequency multiplier 601 of FIG. 5.

Referring further to FIG. 7, mixer 71 receives input $F_B$ from buffer 64 and the other input $F_A$ from the output of buffer amplifier 63. The mixer 71 heterodyne output, which contains the difference frequency product of $\Delta F_s = F_B - F_a$ is applied to variable low pass filter 72.

The difference frequency signal of ($\Delta F_s$) c.p.s. passes unattenuated through variable low pas filter 72, while all other frequency components beyond the filter cut off value, which is set to be slightly greater than $\Delta F_s$, are heavily attenuated.

The output of low pass filter 72 is applied to the input of phase detector 73. Audio reference oscillator 35*a*, which is highly stable, is set to generate the reference signal of $3\Delta F_s$ c.p.s. value. Since in this illustrative description $\Delta F_s$ is 500 c.p.s., then oscillator 35*a* generates 1500 c.p.s. signal. The output of oscillator 35*a* is fed over two paths, one path is to the input of 3:1 frequency divider ($\div 3$) 75 and the other path to contact 3 of I.F. shifter input selector switch 80. Selector switch 80 feeds to the signal input of I.F. balanced modulator 605 of I.F. shifter 602 in the output analysis section 2.

Frequency divider 75 may be a pulse type divider comprising bistable and multivibrators having a Schmidt trigger input circuit to permit digital division of the $3\Delta F_s$ sinusoidal signal from audio oscillator 35*a*. The output of divider 75 is applied to variable low pass filter 77, whose cut-off frequency is set at slightly above $\Delta F_s$. Low pass filter 77 passes the divider 75 $\Delta F_s$ output while rejecting all other frequencies above this value. The output of low pass filter 77 is fed over three paths; one path is to the input of full wave rectifier 78, another path connects to contact 1 of selector switch 80, and the remaining path applies its output as the reference input to phase detector 73. The output of full wave rectifier 78, which is a half sine wave form of fundamental repetition rate $2\Delta F_s$ or twice the rectifier input frequency, is applied to variable low pass filter 79. Filter 79 is set to cut-off slightly above $2\Delta F_s$ value, and supplies its passed output of $2\Delta F_s$ to contact 2 of selector switch 80, while rejecting all other frequencies.

By way of example, variable low pass filters 72, 77 and 79 may be of the well known active feedback selectable R-C filter configuration with sharp cut-off characteristics obtained by cascading a number of such sections. Phase detector 73 functions as a phase comparator and its resultant output is a DC error signal that is proportional to the difference in phase between the two signals being applied thereto. This DC error signal is applied through low pass filter 74 to the voltage sensitive variable capacitance diode of voltage controlled crystal oscillator 62.

The automatic phase control (AFC) loop is thereby closed with low pass filter 74 functioning to stabilize the gain characteristics of the frequency control loop.

The error signal serves as a DC correction voltage bringing about the subsequent phase lock between the $\Delta F_s$ c.p.s. output of low pass filter 72 and the $\Delta F_s$ c.p.s. reference signal output derived from audio oscillator 35*a*. Accordingly the voltage sensitive variable capacitor diode responds to the correction voltage and coacts with the frequency determining circuitry of voltage controlled crystal oscillator 62 in the conventional manner to thereby change its frequency of operation until the two signals being compared by the phase detector 73 are locked in phase. Thus, this automatic phase control (APC) loop acts to precisely maintain the selected audio frequency separation of $\Delta F_s$ c.p.s. between the two RF tones generated, and in so doing, succeeds in essentially equating the stability of tone $F_A$ generation with the generation of tone $F_B$.

Variable DC control bias network 76, which may be a precision potentiometer connected across a well regulated negative DC source, applies its selected bias output to the voltage sensitive variable capacitor diode of oscillator 62. The DC bias voltage supplied brings about the nominal setting of $\Delta F_s$ separation. DC control network 76, low pass filters 72, 77, 79 and audio oscillator 35*a* have their variable controls shown ganged together.

Accordingly thereafter selection at other $\Delta F_s$ interval values as desired, is made by the application of the predetermined DC biasing voltage to voltage controlled crystal oscillator 62 to shift its output tone $F_A$ frequency values.

Likewise variable low pass filters 72 and 77 have their cut-off frequency changed to pass the newly desired $\Delta F_s$ frequency separation signal between the two tone frequencies while variable low pass filter 79 is altered to cut-off at above the 2nd harmonic of new $\Delta F_s$ value, and simultaneously the setting of tunable audio reference oscillator 35*a* provides a frequency value equal to triple the newly desired $\Delta F$ c.p.s. interval and thus brings about the phase control action as previously described.

For the rest of the test system, the operation is similar to that described for the DSB type two tone signal. In the embodiment of FIG. 7, however, audio multiplier 601 is omitted and the specific "M" factors of interest are obtained by way of selector switch 80. Hence for M=1 selector switch 80 is set at contact 1, where $\Delta F_s$ is obtained. Setting swtich 80 to contact 2 gives the second harmonic $2\Delta F_s$ for the factor M=2. In contact 3 position, switch 80 receives the frequency output of audio oscillator 35*a*, which is at $3\Delta F_s$ value thereby providing for M=3. While not illustrated, it is to be further observed that a frequency divider arrangement similar to that of FIG. 7 may well be used for the Double Sideband Case, where "M" factors of 1, 3, 5 are required. In such an embodiment, audio oscillator 35*a* is tuned at $5\Delta F_s$ and divider 75 functions to frequency divide at a 5:1 ratio. Thus M=1 and M=5 factor terms are made available at selector switch 80. For M=3, low pass filter 79 is set to cut-off above $10\Delta F_s$ and its output is mixed with the original $5\Delta F_s$ signal. Thereupon the sum frequency product of $15\Delta F_s$ is selected by variable high pass filter and divided by 5:1 ratio to give, after suitable low pass filtering the desired signal of $3\Delta F_s$.

For illustration of a typical example of the signal processing in the pure RF two tone case, consider FIG. 8, which like FIG. 6 presents the spectrum distribution obtained and includes a chart that specifies the frequency values for the trace-out response operation.

As noted, the frequency axis plot is made with respect to one of the main tone's frequency excursion and in the illustrated case, it is the upper main tone of $F_B$. The explanation of this chart is similar to that of FIG. 6, with the exception that the multiplication factor "*n*" is omitted for convenience. It can be observed that with the disengagement of the generation of tone frequency $F_A$, while maintaining generation of tone frequency $F_B$, then for zero or quiescent frequency shift set, the trace response of $F_B$ is in fact the trace response of $f_1$ and thereby a pure *S/N* sweep frequency response test and plotting system exists.

Tone $F_A$ frequency generation can be reduced to zero level by varying amplitude control 65 to bring about the cut-off of buffer amplifier 63.

It is to be noted that in a narrow band sweeping frequency response plotting test system, wherein for the static test signal of either of the cases stated above a non-scanning technique is used, it is necessary to pay close attention to the relationship between the changing frequency of resultant test signal being applied and the detected response at the particular frequency locations with respect to the visual display of the results over the selected frequency band of interest. This is particularly true since it is known that injection of accurate calibration markers on a CRT display of a narrow band sweep is difficult and limited, as are other means and methods of frequency axis calibration of the CRT screen. In this area, this invention makes full use of the combination of the drift-free principle of the frequency swept modulation and the closed loop time base generation.

It can be seen that this system application which gives IM component response versus frequency location plotting of the device under test is capable of producing rapidly swept continuous visual displays on the CRT screen having conventional P7 phosphorous coating without objectionable flicker; and for highly selective stages, sweep rates of 1 c.p.s. can readily be employed. The system itself is direct reading in that the tuning dial setting of the controlled variable oscillator 10 represents the frequency value at the center of the CRT screen display. For the case of double sideband generation, it represents the quiescent carrier frequency value of the test signal output; while in the case of the pure two tone generation, it represents the quiescent frequency value of one of the main tone frequencies of the test signal output, tone $F_B$ in the given example.

With the controlled variable oscillator 10 having its frequency output set to the center frequency value of the bandpass region of item 200, then the multiplied sweep frequency deviation of crystal control variable frequency oscillator 15 is set to vary about the frequency output of oscillator 10 which at the output of the test signal source becomes, in one case, the mean frequency of the two tone wave being applied; and in alternative case the upper (or lower) main tone frequency being applied to item 200. The total frequency deviation ($\pm N\Delta f_d$) is set to cover the total (100%) bandwidth of the test item 200. Hence, the linear horizontal axis on the CRT screen is calibrated to represent the carrier deviation as ±50 percent of bandwidth from the screen center which is designated the bandpass center.

For the expected wide dynamic range that the test system is to deliver, the visual representation of such a variation cannot be readily interpreted on a 5" CRT screen. Hence it is conventionally practical to use a calibrated pad between the frequency converters 3 and 5 to give a selection of range being observed on the CRT screen such as 40 db, and 40 db with calibrated 20 db pad to give 60 db range, or with calibrated 40 db pad for an 80 db range expansion as desired by the operator.

It now can be seen that on separate scans of the sweep cycle, the plot of detected response with respect to the frequency location in the bandwidth of the device under test can subsequently be made to present a comparative sequence of all response curved of interest and which may be plotted on the CRT screen to the same or related scales wherein all circuit parameters of the device under test remain unchanged.

It is further evident that the patterns obtained from the family of curves traced out by the intermodulation spectrum analyzer can provide a lot more direct information about the cause of distortion than mere measurement of the amount of RF distortion by any other method.

Thus it is also further evident that this specific technique of RF intermodulation spectrum analysis provides for the localization of the distortion source with the display of its frequency characteristic before and beyond the particular point of interest.

It is to be observed that the block diagrams and circuit stages illustrated show only the functional elements that are necessary to explain the operation of this intermodulation spectrum analyzer and that the practical instrument may contain many more conventionally known features, depending upon its specific design and further applications.

The many advantages and unique features of this invention have become readily evident when considered and understood in light of the coaction and integration of the two sections described in detail hereinbefore. It is to be noted that these described embodiments fulfill their greatest purpose in the rapid and automatic signal processing of frequency synthesized high frequency two tone test signal response of quasi-linear electrical units throughout their bandwidth and over a wide frequency range of operation.

While the preferred embodiments of this invention, as illustrated by the associated drawings, and set forth in the specification by way of example, have been presented; it is clear that further modifications will become apparent to others skilled in the art. It is thereby not intended to have this invention limited by the particular arrangements shown and described. It is, therefore, desired that such variations occurring be considered as falling within the true spirit and scope of this invention as defined in the appended claims.

What is claimed is:

1. A circuit for generating a double sideband suppressed carrier amplitude modulated wave which comprises:

a controlled variable oscillator having an output $f_1$, a drift free modulator having therein two frequency converters with the output of one of said converters connected to one of the inputs of the other of said converters, one input of said one converter connected to receive said output of said variable oscillator, a balanced modulator having its output connected to another input of said one converter, a variable audio oscillator having an output $\Delta F_s$, a fixed frequency oscillator having an output $f_{lo}$, said audio and fixed oscillators having their outputs connected to the inputs of said balanced modulator, a voltage variable oscillator having a quiescent output $f_{lo}$, and an output deviating therefrom dependent on the amplitude of the voltage applied thereto, a sawtooth waveform generator having its output connected to the input of said voltage variable oscillator, the output of said voltage variable oscillator connected to another input of said other of said converters, whereby the output of said other of said converters is a pair of frequency swept tone frequency signals symmetrically located about $f_i$ with $f_i$ removed and frequency separated by an amount equal to $2\Delta F_s$.

2. A method of generating a frequency swept symmetrical two tone signal with the carrier removed which comprises the steps of:

generating a carrier frequency, generating a variable audio frequency, generating a local oscillator frequency, mixing said audio frequency and said local oscillator frequency to produce the sum and difference frequencies thereof, frequency converting the combined carrier frequency and said sum and difference frequencies to produce the sum frequencies of the combination thereof, generating a swept frequency about said local oscillator frequency, frequency converting the combined output of said sum frequencies and said sweep frequency to produce the difference frequencies thereof, and thereby generate said two tone signal.

3. A method of generating a frequency swept symmetrical two tone signal with the carrier removed which comprises the steps of:

generating a carrier frequency, generating a variable audio frequency, generating a local oscillator frequency, mixing said audio frequency and said local oscillator frequency to produce the sum and difference frequencies thereof, frequency converting the combined carrier frequency and said sum and difference frequencies to produce the difference frequencies of the combination thereof, generating a swept frequency about said local oscillator, frequency converting the combined output of said difference frequencies and said swept frequency to produce the sum frequencies thereof, and thereby generate said two tone signal.

References Cited

UNITED STATES PATENTS 2,494,345 1/1950 Manke ------------ 331—39 X
2,813,977 11/1957 Carter -------------- 331—39

ALFRED L. BRODY, Primary Examiner

S. H. GRIMM, Assistant Examiner

U.S. Cl. X.R.

325—133; 331—40, 178